United States Patent
Romanoff et al.

(10) Patent No.: US 7,101,045 B2
(45) Date of Patent: *Sep. 5, 2006

(54) AUTOMATIC PAN AND TILT COMPENSATION SYSTEM FOR A CAMERA SUPPORT STRUCTURE

(75) Inventors: Andrew B. Romanoff, Los Angeles, CA (US); Michael J. Keesling, Westlake Village, CA (US)

(73) Assignee: Panavision Inc., Woodland Hills, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/846,367

(22) Filed: May 13, 2004

(65) Prior Publication Data

US 2005/0007553 A1    Jan. 13, 2005

Related U.S. Application Data

(63) Continuation-in-part of application No. 10/104,478, filed on Mar. 22, 2002, now Pat. No. 6,820,980.

(60) Provisional application No. 60/278,095, filed on Mar. 23, 2001.

(51) Int. Cl.
 G03B 19/18    (2006.01)
 G03B 17/00    (2006.01)
 F16M 11/04    (2006.01)

(52) U.S. Cl. .................. 352/243; 352/53; 396/428; 248/187.1

(58) Field of Classification Search ............ 352/53, 352/243; 348/142; 396/419, 428; 248/177.1, 248/187.1, 179.1
See application file for complete search history.

(56) References Cited

U.S. PATENT DOCUMENTS

| | | | |
|---|---|---|---|
| 4,943,019 A | | 7/1990 | Mester |
| 5,012,335 A | * | 4/1991 | Cohodar ............... 348/158 |
| 5,644,377 A | | 7/1997 | Romanoff et al. |
| 5,835,193 A | | 11/1998 | Romanoff et al. |
| 5,900,925 A | | 5/1999 | Navarro |
| 6,094,215 A | | 7/2000 | Sundahl et al. |
| 6,191,842 B1 | | 2/2001 | Navarro |
| 6,351,720 B1 | | 2/2002 | Hoshina et al. |
| 6,552,744 B1 | | 4/2003 | Chen |
| 6,626,412 B1 | | 9/2003 | Lindsay |
| 6,820,980 B1 | * | 11/2004 | Romanoff et al. ......... 352/243 |

* cited by examiner

*Primary Examiner*—Rodney Fuller
(74) *Attorney, Agent, or Firm*—Morrison & Foerster LLP

(57) ABSTRACT

An automated system for compensating the pan and tilt of a camera head for the movements of a camera support structure and/or a subject matter. A processing system receives signals relating to the movement of the camera support structure, such as the swing, boom and telescope of the crane arm, the movements of a dolly, and preferably the movements of a subject matter. The system employs these inputs to determine the position of the camera and subject matter in a defined world coordinate system and sends signals to compensate the pan and tilt of the camera head so that the field of view of the camera is generally centered on the subject matter being filmed as defined within the system.

18 Claims, 20 Drawing Sheets

AUTOMATIC PAN AND TILT COMPENSATION SYSTEM FOR A CAMERA SUPPORT STRUCTURE

CROSS-REFERENCE TO RELATED APPLICATIONS

This application is a Continuation-In-Part (CIP) of U.S. application Ser. No. 10/104,478 entitled "Automatic Pan and Tilt Compensation System for a Camera Support Structure" filed on Mar. 22, 2002, now U.S. Pat. No. 6,820,980 which claims priority to provisional application Ser. No. 60/278, 095 filed Mar. 23, 2001, the contents of which are incorporated herein by reference.

FIELD OF THE INVENTION

The field of the present invention relates generally to camera positioning systems. For the purpose of this application a camera shall refer to any type of device capable of recording or transmitting either still or moving images including but not limited to conventional cinema cameras, conventional still cameras, television cameras, videotape cameras, digital cameras, CCD cameras, or the like.

BACKGROUND OF THE INVENTION

Traditionally, camera cranes and dollies have been employed to assist in the positioning of cameras at defined locations and orientations to capture the desired shot. Conventional camera cranes are generally comprised of a crane arm (or "jib"), a support structure to which the crane arm is mounted, and a "leveling head" affixed to the distal end of the crane arm. Typically, the crane arm is pivotally coupled to the support structure in a manner that facilitates the rotation of the crane arm about a vertical and a horizontal axis. The rotation of the crane arm about the vertical axis is generally referred to as crane arm "swing," while the rotation of the crane arm about the horizontal axis is generally referred to as crane arm "boom." In addition to the crane arm being capable of swing and boom, conventional crane arms are often constructed to be adjustable in length, so that the crane arm can "telescope" from one length to another. Thus, the distal end of the crane arm (i.e., the end affixed to the leveling head) is capable of translating through a semi-sphere, the diameter of which is controlled by the overall length of the crane arm, which can be adjusted by telescoping the crane arm. Moreover, camera cranes are often mounted on a rolling platform that is generally referred to as a "dolly."

Conventional camera dollies are different from the dollies used to support camera cranes mentioned above, in that instead of supporting a complex crane arm that can swing, boom and telescope, conventional camera dollies support a simpler camera platform which may only be raised or lowered. Conventional camera dollies exist in two basic forms, and typically employ wheels for movement. Some dollies have rectangular-shaped frames with a steering lever at the back, and others are symmetrical and steerable from any side. The camera platform is provided on the dolly for mounting a camera, and is typically supported by a single or double hinged arm which raises or lowers the platform using a hydraulic ram. Other dollies provide vertical movement using a hydraulic center post. In either case, the platform is raised in a vertical direction with respect to the frame of the dolly, and a leveling mechanism may be employed within the arm or post to maintain the platform level with respect to the frame of the dolly.

In a modern dolly, several modes of steering may be available. In a "conventional" mode of steering, the back wheels turn and the front wheels are fixed, or vice versa. In another mode of steering, called a "crab" mode, all four wheels turn together in parallel. In a "modified crab" mode, the front wheels turn together, and the back wheels turn together, but the front and back wheels are not necessarily parallel (typically the front wheels turn more than the back wheels). In yet another mode of steering called a "roundy" mode, the wheels are oriented so that the dolly can spin in place. Some dollies are configured for only one of these modes. By moving a lever on the dolly, other dollies are configurable into one of these modes.

Dollies are typically pushed and steered, and their platforms raised and lowered, by a dolly grip. Even though the technology exists to control the dolly remotely, it is difficult to replace the human element of an experienced dolly grip, who is able to watch a scene being performed and position and move the dolly while anticipating and compensating for deviations from the planned rehearsed movements of the actors. Moreover, dolly grips generally move at the same rate as actors, unlike joysticks and computer controls, which can move abruptly, and are thus generally better than remote controls at compensating for movements of actors.

The leveling head is a mechanism that is typically employed to connect the camera crane arm to a camera mounting structure referred to as a "camera head." Leveling heads are generally comprised of a leveling mechanism that functions to maintain a "leveling plate" parallel to a defined plane in response to changes in the boom of the crane arm. As used in this application a "leveling plate" is a defined member of the leveling head that is adapted to being coupled to the camera head. An example of such a leveling head is disclosed in U.S. Pat. No. 4,943,019, which is hereby incorporated by reference.

Conventional camera heads, in addition to providing a support structure to securely mount the camera, are typically adapted to rotate about a vertical axis (i.e., panning) and a horizontal axis (i.e., tilting) relative to the leveling plate. To facilitate the panning and tilting of the camera head, two independently actuated motor mechanisms are usually employed. The first is often referred to as a "camera pan motor," which as the name suggests facilitates the panning of the camera head (i.e., the rotation of the camera head about the vertical axis). The second is often referred to as a "camera tilt motor," which also as the name suggests facilitates the tilting of the camera head (i.e., the rotation of the camera head about the horizontal axis).

In operation, the boom (i.e., the rotation of the crane arm about a horizontal axis), swing (i.e., the rotation of the crane arm about a vertical axis), telescope (i.e., the length of the crane arm), and the movement of the rolling platform or dolly are typically controlled manually by one or more operators or "grips." The adjustments of the leveling head are usually automated to respond to the change in the boom so as to maintain the camera head generally level to the horizontal plane. The "pan" and "tilt" of the camera head together with the focus of the camera, on the other hand, have been traditionally controlled remotely (usually via electrical circuitry) by another operator, referred to as the "camera-operator," who is responsible for the composition of the shot (i.e., the field of view and focus of the camera).

Thus, the camera-operator, in fashioning the composition of the shot, must compensate the field of view of the camera by panning and tilting the camera head in response to movements of the crane arm, dolly, and the subject matter being filmed. In light of the complex dynamics of such systems, the camera-operator's task can be extremely difficult, especially when filming complicated shots. Consequently, situations inevitably arise where the field of view of the camera is not accurately or in a timely fashion compensated for the movements of the crane arm and/or dolly. In addition, situations also arise, with or without movement in the camera crane or dolly, where the field of view of the camera is not accurately compensated for the movement of the subject matter. As a result, considerable expense and time is expended in re-shooting.

To assist the camera operator in achieving the desired composition, some camera heads such as those disclosed in U.S. Pat. Nos. 5,644,377 and 5,835,193, which are hereby incorporated by reference, employ an automated back pan compensation mechanism that, when activated, pans the camera head in a reverse direction relative to the swing of the camera crane arm. The amount of pan compensation may be adjusted by the user prior or during filming. These compensation mechanisms, however, simply reverse pan the camera head in response to changes in the swing of the crane arm without reference to the other potential movements of the camera support structure (e.g., boom, telescope, or dolly movement) or changes in the position of the subject matter being filmed. Furthermore, these compensation mechanisms are not readily suited for achieving accurate back pan compensation in response to changes in the swing of the crane arm. This is so because there is non-linear relationship between changes in the angular position of the camera arm and the desired angular back pan of the camera head. Thus, these systems require adjustment/calibration of the back pan gain, especially when large changes in the swing of crane arm occur. Consequently, these compensation mechanisms, while potentially helpful in assisting the camera operator in panning the camera head in certain circumstances, may not provide suitable assistance in situations in which the movement of the camera support structure is more complex or when a change in the position of the subject matter occurs.

SUMMARY OF THE INVENTION

The present invention relates in one aspect to a camera positioning system, whereby the positioning system provides for compensation for the movement of the camera support structure. A separate aspect of the present invention relates to a camera positioning system, whereby the positioning system provides for compensation for the movement of a subject matter. Yet another separate aspect of the present invention relates to a camera positioning system, whereby the positioning system provides for compensation for the movement of both the camera support structure and the subject matter. Two or more of these aspects may be combined.

Additional embodiments, features, variations and advantages of the invention are set forth in the description and accompanying drawings that follow, and are further evident on consideration thereof.

BRIEF DESCRIPTION OF THE DRAWINGS

The accompanying drawings illustrate presently preferred implementations of the invention and, together with the description, serve to explain various principles of the invention.

DETAILED DESCRIPTION OF THE PREFERRED EMBODIMENT

Figure 1:
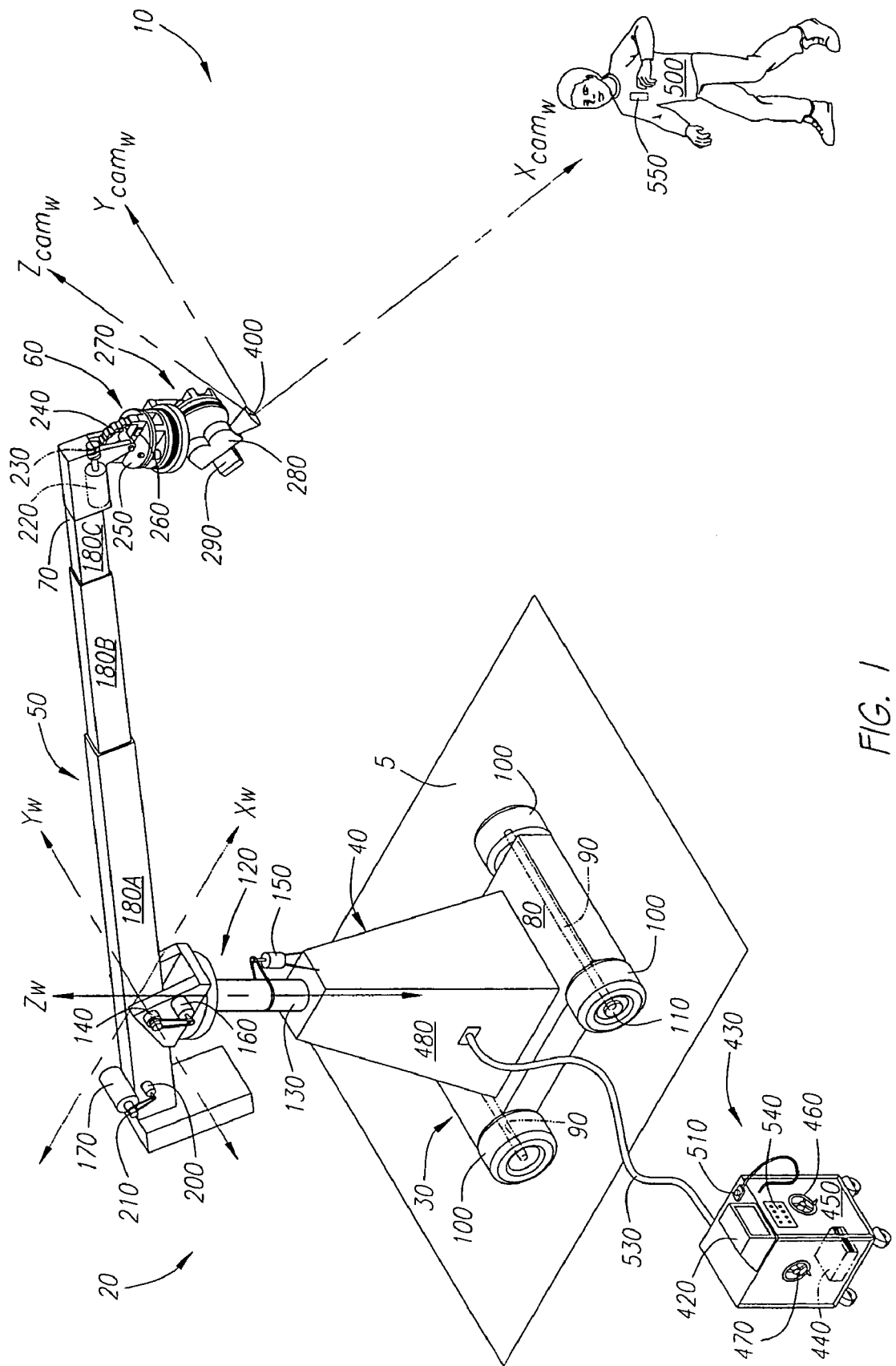
FIG. 1 is a perspective view of a preferred embodiment of a camera positioning system including a remote camera head.

The preferred embodiments will now be described with reference to the drawings. To facilitate description, any reference numeral designating an element in one figure will designate the same element if used in any other figure. The following description of the preferred embodiments is only exemplary. The present invention is not limited to these embodiments, but may be realized by other embodiments. Furthermore, in describing preferred embodiments, specific terminology will be resorted to for the sake of clarity. However, the invention is not intended to be limited to the specific terms so selected.

FIG. 1 is a perspective view of a preferred camera positioning system 10 depicting components capable of being used in connection with preferred automatic pan and tilt compensation control system architectures described herein. Shown in FIG. 1 is a preferred configuration of a camera support structure 20 capable of movement with multiple degrees of freedom. The camera support structure 20 is comprised of a movable platform or dolly 30, a crane arm support structure 40 mounted on the dolly 30, a telescoping crane arm 50 pivotally mounted to the crane arm support structure 40, and a leveling head 60 mounted to the distal end 70 of a the crane arm 50.

The dolly 30 includes a base structure 80 to which the crane arm support structure 40 is mounted. To facilitate movement of the dolly 30, the base structure 80 includes two axles 90 (shown in phantom) with each axle having two wheels 100 mounted thereto. A dolly sensing device 110 is employed to monitor the movement of the dolly 30 and transmit via "suitable communication means" data relating to the movement of the dolly 30 to a processing system 440 (shown in phantom in FIG. 1). For the purposes of this application "suitable communications means" shall mean electrical, electro-magnetic, optical, mechanical or any other means suitable for transferring data between the sensing device and the processing system employed. Also for the purposes of this application "movement" shall mean the act, process, or result of moving.

In the system 10 illustrated in FIG. 1, the dolly 30 is configured to be capable of rolling back and forth on a support surface 5 in a direction that is generally parallel to the axis depicted in FIG. 1 as $X_w$. It is sufficient, in such a configuration, that the dolly sensing device 110 be comprised of a single rotary encoder, such as part number 8-5800-2146-5000 manufactured by Fritz Kubler GMBH of Germany that is fitted to one of the four wheel/axle assemblies 100/90 of the dolly 30 and adapted to monitor the rotation of the wheel 100 relative to axle 90 and transmit data relating to the rotation of the axle 90 to the processing system 440 via electrical communications transmitted through electrical cable 530.

It is contemplated, however, that other dolly configurations may be capable of different or additional movement. For example, the dolly 30 may be adapted to move in a manner similar to an automobile or tricycle or may be configured to slide back and forth, shift from side to side or move up or down. The dolly sensing device 110 employed, however, should preferably be capable of monitoring sufficient stimuli relating to the movement or position of the dolly 30 so that changes in the position and orientation of the dolly 30 may be determined with reference to the relevant structural configuration of the particular dolly 30 employed.

The crane arm 50 is preferably mounted in a suitable fashion to the crane arm support structure 40 via a coupling mechanism 120. The coupling mechanism 120 facilitates, via a rotatable support shaft 130, the rotation of the crane arm 50 about a vertical axis, which in FIG. 1 corresponds with the axis called out as $Z_w$, so as to permit changes in the swing angle of the crane arm 50. In addition, the coupling mechanism 120 facilitates, via a horizontal pivot 140, the rotation of the crane arm 50 about a horizontal axis, which in FIG. 1 corresponds with the axis called out as $Y_w$, so as to permit changes in the boom angle of the crane arm 50.

A crane arm swing sensing device 150 is employed to monitor the swing (i.e., the rotation of the crane arm about the vertical axis) of the crane arm and transmit via suitable communication means data relating to crane arm swing to the processing system 440. Similarly, a crane arm boom sensing device 160 is employed to monitor the boom (i.e., the rotation of the crane arm about the horizontal axis) of the crane arm and transmit via suitable communication means data relating to the crane arm boom to the processing system 440.

In the system 10 illustrated in FIG. 1, the swing and boom sensing devices 150, 160 may individually comprise a rotary encoder such as part number 8-5800-2146-5000 manufactured by Fritz Kubler GMBH of Germany. As illustrated in FIG. 1, the rotary encoder swing sensing device 150 employed to monitor the swing of the crane arm 50 is preferably fitted to the housing 480 of the support structure 40 and monitors via a toothed belt the rotation of the support shaft 130 relative to housing 480. Similarly, the rotary encoder boom sensing device 160 employed to monitor the crane arm boom is preferably mounted to the side wall of the coupling mechanism 120 and monitors via a toothed belt the relative rotation of the horizontal pivot 140. Each of the encoder sensing devices 150, 160 are adapted to transmit data relating to their respective monitored stimuli to the processing system 440 via electrical communications transmitted through electrical cable 530.

The telescoping crane arm 50 is preferably comprised of nested sections 180A, 180B, and 180C configured so that each inner section is supported within the outer adjacent section. Extension of the crane arm inner sections 180B, 180C is preferably controlled by means of a crane arm telescope motor 170 mounted at the end of the crane arm 50 opposite the leveling head 60. The crane arm telescope motor 170 supplies drive via a cable and pulley mechanism 190 (not illustrated) such as that disclosed in U.S. Pat. No. 4,939,019, already incorporated by reference, so as to facilitate the extension and retraction of the crane arm sections 180B, 180C.

A crane arm telescope sensing device 200 is employed to monitor the telescope (e.g., length) of the crane arm 50 and transmit data via suitable communication means relating to the crane arm telescope to the processing system 440. In the system 10 illustrated in FIG. 1, the crane arm telescope sensing device 200 comprises a rotary encoder, such as part number BDE 05.05A500 manufactured by Baumer Electric of Switzerland. As illustrated in FIG. 1, the encoder telescope sensing device 200 is mounted to the wall of crane arm section 180A and is adapted to monitor via a toothed belt the rotation of the drive shaft 210 of the crane arm motor 170. The encoder telescope sensing device 200 is also preferably adapted to transmit data relating to the rotation of the drive shaft 210 to the processing system 440 via electrical communications transmitted through electrical cable 530.

Figure 2:
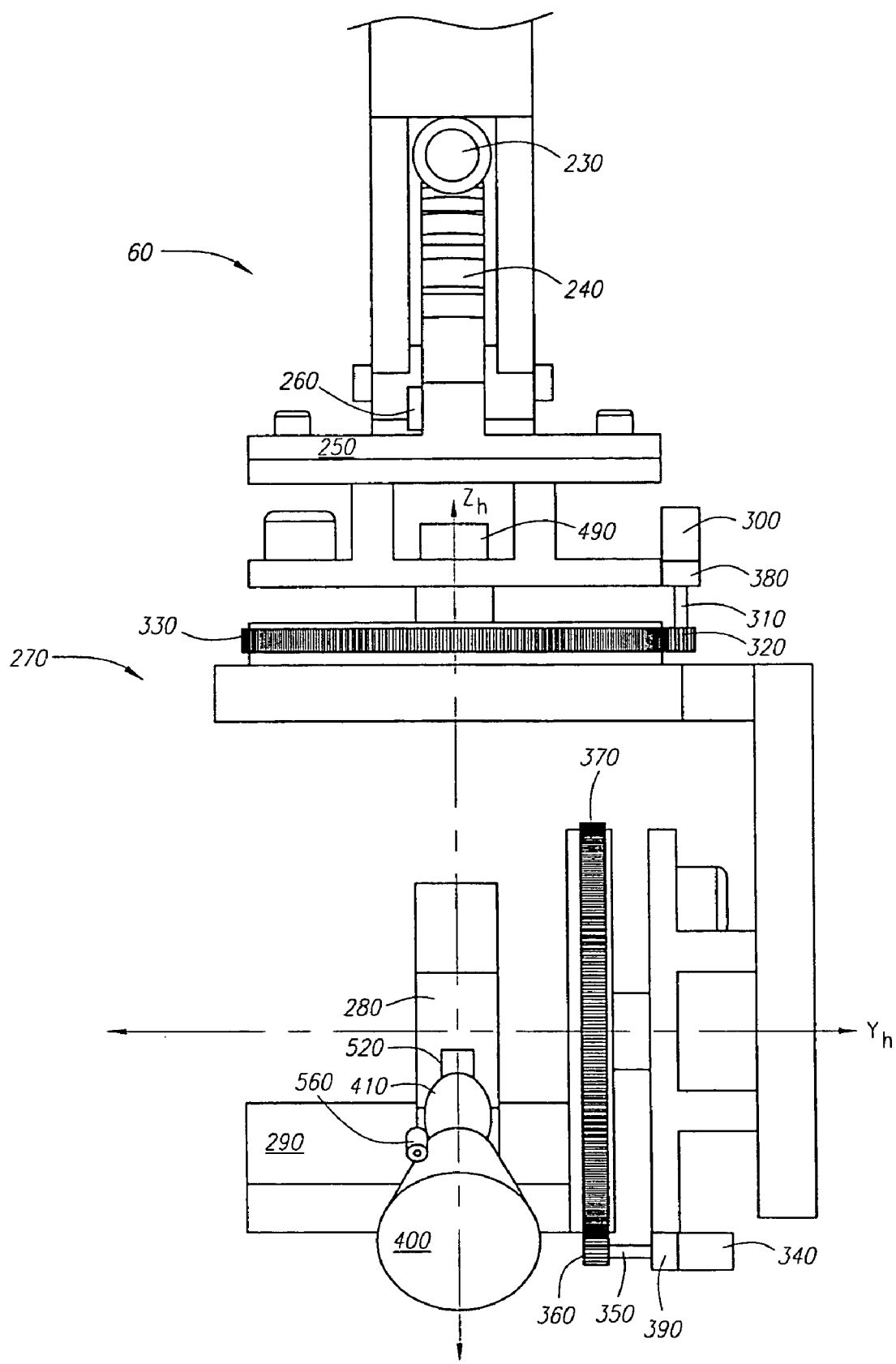
FIG. 2 is a detailed illustration of the remote camera head depicted in FIG. 1.

The leveling head 60 is preferably configured to be removably coupled to the distal end 70 of the innermost crane arm section 180C. A leveling head motor 220 (shown in phantom) is mounted within the housing of the leveling head 60 and drives a worm 230 that is adapted to engage a semicircular worm gear 240, the base of which defines a leveling plate 250. As best seen in FIG. 2, a level sensor 260, such as a mercury tilt switch, is fitted to the worm gear 240 just above the leveling plate 250 and is electrically connected to the leveling head motor 220. The level sensor 260 is configured to activate the leveling head motor 220 to maintain the leveling plate 250 horizontal with respect to a defined plane (e.g., horizon, ground, etc.) in response to changes in the boom of the crane arm 50.

As best illustrated in FIG. 2, secured to the leveling plate 250 is a remote camera head 270 having a motion picture camera 280 secured to a mounting platform 290. The camera head 270 is further comprised of a pan motor 300 that drives via an axle 310 a gear head 320, which engages a pan gear ring 330 that when driven rotates the mounting platform 290 about a vertical axis depicted in FIG. 2 as $Z_h$. In addition, the camera head 270 is comprised of a tilt motor 340 that drives via an axle 350 a gear head 360, which engages a tilt gear ring 370 that when driven rotates the mounting platform 290 about a horizontal axis depicted in FIG. 2 as $Y_h$.

A pan sensing device 380 is employed to monitor the pan (i.e., the movement or rotation of the camera head about the vertical axis $Z_h$) of the camera head 270 and transmit via suitable communication means data relating to camera head pan to the processing system 440. Similarly, a tilt sensing device 390 is employed to monitor the tilt (i.e., the movement or rotation of the camera head about the vertical axis $Y_h$) of the camera head 270 and transmit via suitable communication means data relating to the camera head tilt to the processing system 440.

In the system illustrated in FIGS. 1 and 2, the pan and tilt sensing devices 380, 390 may each be comprised of an encoder such as part number BDE 05.05A500 manufactured by Baumer Electric of Switzerland. Each encoder is fitted to its corresponding axles 310, 350 of the pan and tilt motors 300, 340 and is adapted for monitoring the rotation of respective axles 310, 350 and for transmitting data relating to the rotation of the axles 310, 350 to the processing system 440 via electrical communication transmitted through electrical cable 530. It is to be understood that other types of camera heads may also be utilized. For example a gyro stabilized camera head such as Westcam gyro stabilized head manufactured by Westcam Corporation of Canada may be employed.

The camera 280 is comprised of a camera lens 400 such as a Panavision 11 to 1 zoom lens and lens motor 410 such as Panavision FTZAC motor, both of which are manufactured by Panavision Corporation of United States of America. The lens motor 410 being adapted to actuate a change in the plane of focus of the camera lens 400. To facilitate the camera operator's observations of the composition of the shot, the images captured by the camera 400 are preferably transmitted in real-time via suitable communication means, such as the electrical cable 530, to a camera monitor 420 (illustrated in FIG. 1).

As illustrated in FIG. 1, the camera monitor 420 is preferably located on a camera operator control module 430. The camera operator control module 430 is preferably displaceable from the camera support structure 20 so as to provide suitable room for manipulation of the camera support structure 20, thereby minimizing potential for interference between the camera support structure 20 and the camera operator control module 430. It is to be understood, however, that the camera operator control module 430 may be otherwise located for example it may be integrated with the support structure 20 such as in a traditional platform based camera crane such as that illustrated in FIGS. 6A and 6B of U.S. Pat. No. 5,644,377 previously incorporated by reference. The control module 430 is comprised of a compartment 450 preferably adapted to being movable. Preferably housed within the compartment 450 is the processing system 440 (shown in phantom). As will be discussed in more detail below, the processing system 440 generally receives data from one or more sensing devices, processes that data, and transmits signals to compensate the pan and tilt of the camera head 270 to maintain the camera's field of view on a desired subject matter 500, the position of which is defined within the processing system 440 relative to a predefined coordinate system. It is to be understood that the subject matter 500 as defined within the processing system 440 is simply a defined position in space within the coordinate system being employed, which does not necessarily correlate with the location of a particular physical entity. The exact position of the particular physical entity is not necessarily required or desired, because cameras are not gunsights. Cameras are framing devices, and often the object of interest is a composition of elements and is not placed in the center of the frame but off to one side of the frame. The processing system 440 is activated via a system activation/calibration control 540 preferably located on the camera operator control module 430. In the preferred embodiment, the system activation/calibration control 540 is comprised of a panel of switches that are capable of activating and/or setting the calibration of the processing system 440. Other suitable input devices, such as keyboard or the like, may also be employed and may be configured to receive input from the user relating to the particular logic to be employed by the processing system 440 in compensating the pan and tilt, in calibrating the system, or in defining the position of the subject matter 500.

Due to the wide variety of computational devices and programming available to implement the functions of the processing system 440, the processing system 440 is broadly defined as one or more computational devices capable of performing the functions described herein. For example, the processing system 440 may be embodied as a computer such as is manufactured by IBM™ or Apple™, a server such as is manufactured by Sun Microsystems™, or a main frame computer. The processing system 440 may be configured to process analog or digital signals. The processing system 440 may be comprised of general purpose or special purpose CPUs, it may have volatile or non-volatile memory, and it may have programming for enabling the receipt, processing and transmission of communications over the communications means employed. The processing system 440 may employ multiple processors that perform different processing tasks, or have the same tasks distributed between processors. Further, the processing system 440 may processes some or all of the processing via hard-wired circuitry such as an ASIC, FPGA or other logic devices. Thus, as used throughout, processing system refers to a wide variety of computational devices or means for implementing the functions described herein, namely the receipt of communications from one or more sensing devices, the processing of those communications, and the transmission of suitable communications for actuating the pan and tilt of the camera head 270. The processing system may additionally be configured to store information (e.g., meta-data) that it receives or transmits for later use or additional analysis.

To facilitate a camera operators control of the pan and tilt of the camera head 270, camera operator pan compensation control device 460 and a camera operator tilt compensation control device 470 are provided and employed. The pan and tilt compensation control devices 460, 470 are in communication via suitable communications means with the pan and tilt motors 300, 340.

As illustrated in FIG. 1, the pan and tilt compensation control devices 460, 470 are comprised of rotating hand wheels and tachometers (not shown). Each tachometer monitors the rotation of the corresponding pan and tilt hand wheels and sends electrical signals via the electrical cable 530 to a camera head servo amplifier 490 (illustrated in FIG. 2), which actuates the pan and tilt motors 300, 340.

In order to facilitate the camera operator's control over the focus of the camera lens 400, a remote camera lens control device 510 is employed to focus the camera lens 400. The camera lens control device 510 is in communication with the camera lens motor 410 via suitable communications means.

As illustrated in FIG. 1, the camera lens control device 510 may be comprised of a dial control device such as a Panavision FTZAC control, manufactured by Panavision Corporation of the United States of America. The dial control device 510 is preferably configured to transmit, in response to the rotation of the dial, electrical signals via the electrical cable 530 to a camera lens servo amplifier 520 (best illustrated in FIG. 2), which actuates the lens motor 410 to change the focus of the lens 400. The camera-operator may monitor the focus of the lens via the camera monitor 420.

It is to be understood that while certain sensing devices, such as rotary encoders, have been illustrated, other sensing devices may also be employed such as accelerometers, magnetometers, linear variable differential transformers, rotary variable differential transformers, laser triangulation, laser interferometry, gyroscopes, capacitance tilt sensors, mass tilt sensors, potentiometers, laser time of flight devices, sonar, radar global positioning, and any other suitable device capable of or adaptable to sensing stimuli that can be correlated to the movement or change in position of a structure or combination of structures.

Furthermore, as can be surmised from the sensing devices listed above, it is to be understood that the sensing device(s) employed need not be mounted physically on the structure being monitored. Moreover, it is to be understood that while one or more sensing devices may be employed to monitor each degree of freedom of movement and/or each individual moving element of the support structure 20, the sensing device(s) employed need not do so. The sensing device(s) employed may only include sufficient capability so that the position or change in position of the camera 280, or an approximation thereof, may be determined in relationship to a coordinate system, preferably in 3-dimensional space. For example, the camera support structure sensing device(s) 600 may include sufficient capability for determining the position of the distal end 70 of the camera crane arm 50 or the position and/or orientation of the leveling head 60, which can be correlated to the position of the camera 280. Thus, it is contemplated that a single sensing device such as a GPS device may be employed to monitor the movement or position of the distal end 70 of the camera support structure 20, the leveling head 60, or the camera 280.

Figure 3:
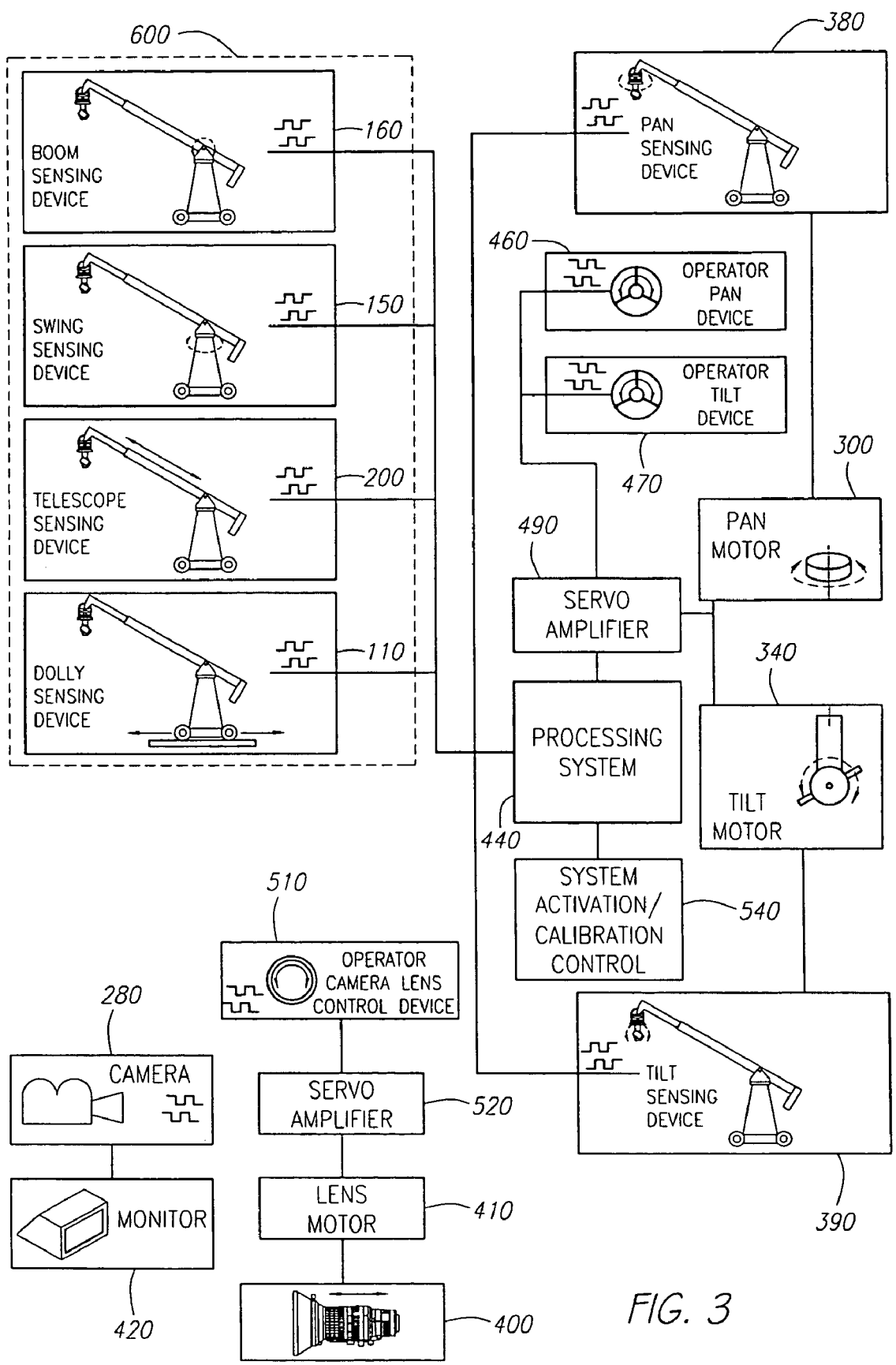
FIG. 3 is a block diagram illustrating a first preferred automatic pan and tilt compensation control system architecture capable of being used in connection with the camera positioning system illustrated in FIG. 1.

FIG. 3 is a block diagram illustrating a first preferred automatic pan and tilt compensation control system architecture capable of being used in connection with the camera positioning system 10 illustrated in FIG. 1. As shown in FIG. 3 camera support structure sensing device(s) 600 preferably including crane arm boom, crane arm swing, crane arm telescope, and dolly sensing devices 160, 150, 200, 110 together with the pan and tilt sensing devices 380, 390 are in communication with processing system 440. Operator pan and tilt compensation control devices 460, 470 are in communication with the camera head servo amplifier 490, which is in communication with pan and tilt motors 300, 340. In addition, the processing system 440 is in communication with the camera head servo amplifier 490. Activation of the processing system 440 is controlled by the system activation/calibration control 540.

Independently, the remote operator camera lens control device 510 is in communication with the camera lens servo amplifier 520, which is in communication with lens motor 410, which in turn focuses the camera lens 400. Also, to facilitate the transmission of images captured by the camera for viewing by the camera operator, the camera 280 is in independent communication with the camera monitor 420.

In operation, a world coordinate system is defined within the processing system 440 relative to an initial position of the camera support structure 20 (e.g., the position of the camera support structure 20 at the time the system 10 is activated). In FIG. 1, the world coordinate system is depicted by the axis identified as $X_w$, $Y_w$, and $Z_w$. The origin of the world coordinate system is preferably defined to coincide with an initial position of the coupling mechanism 120 (e.g., centered at the horizontal pivot 140). The $X_w$ axis is preferably defined to coincide with the direction and orientation of the crane arm 50 when the crane arm swing and boom angles are zero. In other words, when the crane arm's boom component is parallel with or horizontal with the ground plane or support surface 5 and when the crane arm's boom component is parallel with the line defined by the forward direction of the dolly 30. Once defined, the world coordinate system is the coordinate system by which objects and structures are located in three-dimensional space within the processing system 440. It is to be understood that coordinate systems other than a Cartesian coordinate system may be employed such as a polar coordinate system. It is also to be understood that the coordinate system employed need not have its origin located at an initial position of the support structure 20.

Figure 4:
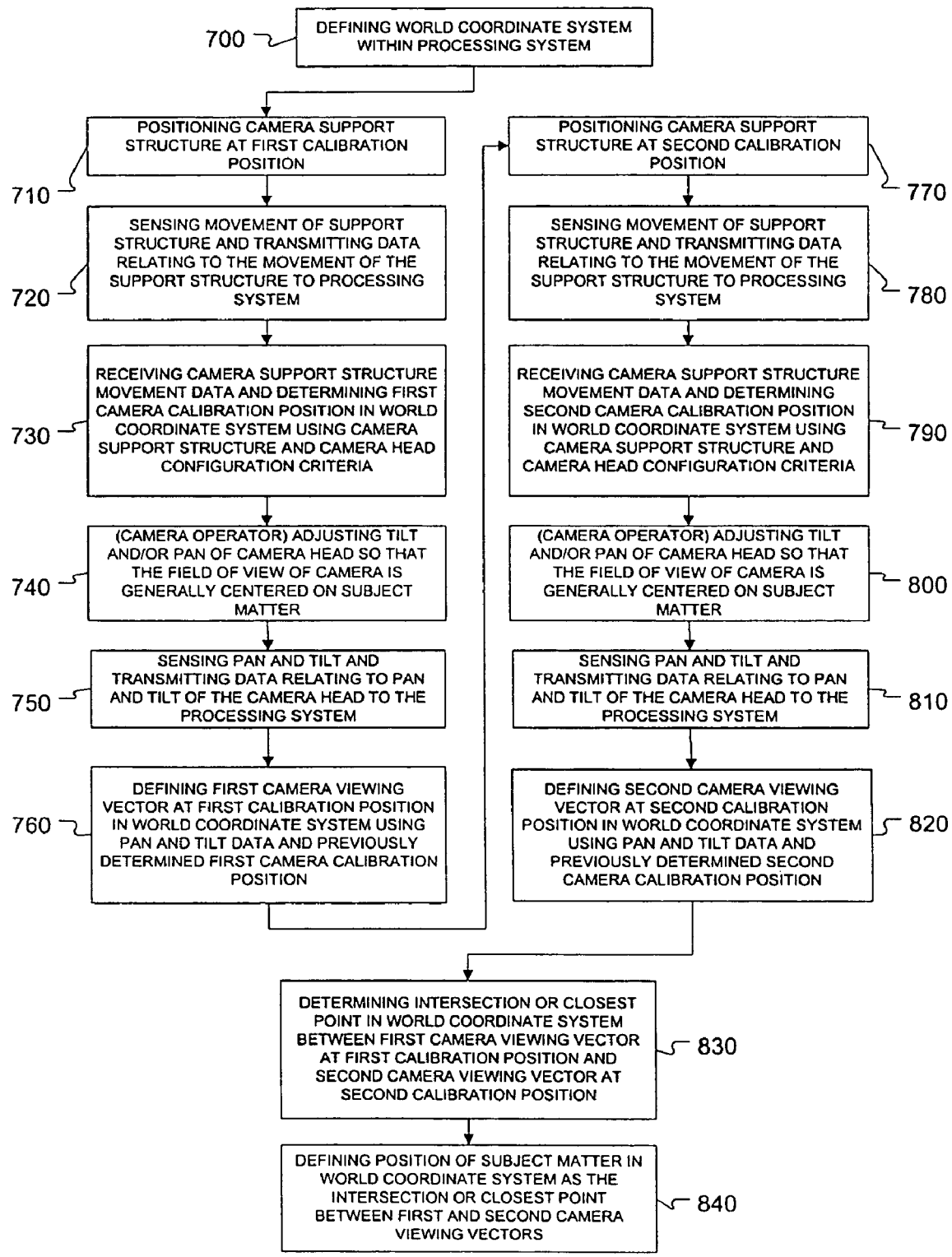
FIG. 4 is a flow chart detailing preferred steps for defining the position of a subject matter relative to a defined world coordinate system in accordance with the first preferred automatic pan and tilt compensation control system architecture illustrated in FIG. 3.
Figure 5:
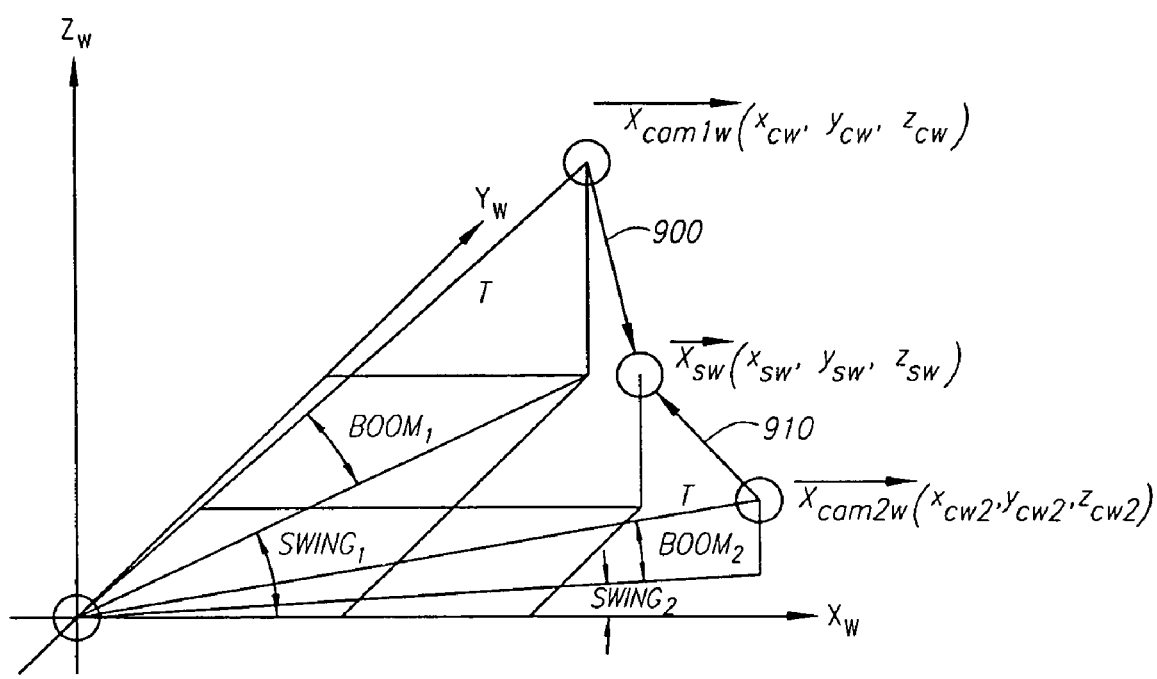
FIG. 5 is a vector diagram illustrating, with respect to a defined world coordinate system, a first and second camera viewing vector for a first and second camera position and a defined subject matter position.

FIG. 4 illustrates a flow chart detailing preferred steps for defining the position of a subject matter relative to the defined world coordinate system in accordance with the first preferred automatic pan and tilt compensation control system architecture illustrated in FIG. 3. As shown in FIG. 4, defined within the processing system 440, as previously discussed, is the world coordinate system (step 700). Once defined, the camera support structure 20 is positioned at a first calibration position (step 710). The camera support structure sensing device(s) 600 senses movement, if any, (e.g., change in boom, swing, telescope, dolly) of the support structure 20 and transmit data relating to the movement of the support structure 20 to the processing system 440 (step 720). The processing system 440 receives the data from the camera support structure sensing device(s) 600 and determines from the data a first camera calibration position using camera support structure 20 and camera head 270 configuration criteria (step 730). As illustrated in FIG. 5, the first camera calibration position is called out as $\overrightarrow{X_{cam1w}}$ and is defined by coordinates $x_{cw}$, $y_{cw}$, $z_{cw}$ in the world coordinate system $X_w$, $Y_w$, $Z_w$.

The camera support structure and camera head configuration criteria employed in the determination of step 730 is dependent on the particular camera support structure and camera head configuration employed in connection with the particular sensing devices employed. Preferably, the criteria employed should include sufficient information to correlate the sensor data of the monitored stimuli to the position of camera 280 or camera lens 400. For example in the preferred embodiment illustrated in FIG. 1, the criteria may include information to correlate the data relating to the rotation of the axle 90 of the dolly 30 to a measurement of the change in position of the dolly 30. Another example is that the criteria may include information regarding a particular dimensional offset such as the dimension between the position of the camera 280 and a given reference point such as the leveling plate 250 or the distal end 70 of the camera crane arm 50. Yet another example is that the criteria may include consideration relating to the dynamics of the particular leveling head 60 or camera head 270 employed. In sum, the location or change in position within the coordinate system of the camera 280 may be determined from the totality of the configuration criteria employed in connection with the sensing devices employed and the data derived therefrom.

Once the camera support structure 20 is positioned at the first calibration position, the camera-operator adjusts via the camera-operator pan and tilt compensation devices 460, 470 the pan and tilt of the camera head 270 so that the field of view of the camera 280 is generally centered in the desired position on the subject matter 500 (step 740). The pan and tilt sensing devices 380, 390 transmit to the processing system position data relating to the pan and tilt of the camera head 270 (step 750). The processing system 440 receives the data from the pan and tilt sensing devices 380, 390 and defines a first camera viewing vector (called out as 900 in FIG. 5) for the first camera calibration position in the world coordinate system using the data from pan and tilt sensing devices and the previously determined first camera calibration position (step 760). After the support structure 20 is positioned at the first calibration position, the camera operator via the system activation/calibration control 540 may in a preferred implementation set the first calibration position in the processing system 440 and thereby affirmatively identify the calibration position that the operator wishes the processing system 440 to employ.

The camera support structure is then positioned at a second calibration position (step 770). The camera support structure 20 sensing device(s) 600 senses movement of the camera support structure 20 and transmits data relating to the movement of the camera support structure 20 to the processing system 440 (step 780). The processing system 440 receives data from the camera support structure sensing device(s) 600 and determines from the data a second camera calibration position using camera support structure 20 and camera head 270 configuration criteria (step 790) as previously discussed in relation to step 730. As illustrated in FIG. 5, the second camera calibration position is called out as $\overrightarrow{X_{cam2w}}$ and is defined by coordinates $X_{cw2}$, $Y_{cw2}$, $Z_{cw2}$ in the world coordinate system $X_w$, $Y_w$, $Z_w$.

After positioning the camera support structure 20 at the second calibration position, the camera operator again adjusts via the camera-operator pan and tilt compensation devices 460, 470 the pan and tilt of the camera head 270 so that the field of view of the camera is generally centered on the subject matter 500 (step 800) as it was in step 740. The pan and tilt sensing devices 380, 390 again transmit to the processing system 440 data relating to the pan and tilt of the camera head 270 (step 810). The processing system 440 receives the data from the pan and tilt sensing devices 380, 390 and defines a second camera viewing vector (called out as 910 in FIG. 5) for the second calibration position in the world coordinate system using the data from the pan and tilt sensing devices and the previously determined second camera calibration position (step 820). After the support structure 20 is positioned at the second calibration position, the camera operator via the system activation/calibration control 540 may in a preferred implementation set the second calibration position in the processing system 440 and thereby affirmatively identify the calibration position that the operator wishes the processing system 440 to employ.

Once the processing system 440 has determined the two camera viewing vectors, 900, 910 in reference to the world coordinate system and their corresponding calibration positions, the processing system 440 determines the intersection or closest point between the first and second camera viewing vectors in the world coordinate system (step 830). The processing system 440 then defines the position of the subject matter 500 in the world coordinate system as the intersection or closest point between the first and second camera viewing vectors (step 840).

The camera position and camera viewing vector may be calculated via the application of established mathematical principles. With reference to FIG. 5, a simplified example of such calculations follows. In this example the camera position will be estimated to be the same as the distal end 70 of the camera crane 50 and the dolly 30 is assumed to have not moved from its initial position in which the world coordinate system was defined (i.e., the crane arm at the horizontal pivot 140 is still centered at the origin of the world coordinate system). Consequently, dimensional offsets from the distal end 70 of the crane arm 50 to the camera are not included in these calculations.

The camera position of the first camera calibration position, $\overrightarrow{X_{cam1w}}$, may be calculated with respect to the world coordinate system via the following equation:

$$\overrightarrow{X_{cam1w}} = \begin{bmatrix} x_{cw} \\ y_{cw} \\ z_{cw} \end{bmatrix} = \text{First Camera Calibration Position} \quad (1)$$

Where:

$x_{cw} = T \times \cos(\text{boom angle}) \times \cos(\text{swing angle})$ $y_{cw} = T \times \cos(\text{boom angle}) \times \sin(\text{swing angle})$ $z_{cw} = T \times \sin(\text{boom angle})$ $T = \text{Telescope of crane arm}$ (distance from origin of world axes to camera)

The boom and swing angle together with the telescope of the crane arm 50 is determined from the camera support structure sensing device(s) 600. Assuming that a leveling head 60 is employed to maintain the leveling plate 250 level with the ground 5 with changes in the boom angle of the crane arm 50, the first camera viewing vector (called out as 900 in FIG. 5) may be calculated as follows:

First rotate the camera through the swing angle of the camera crane:

$$\overrightarrow{x'_{camw}} = R_{zw}(\text{swing angle}) \times \overrightarrow{x_{camw}} \quad (2)$$

where:

$\overrightarrow{x_{camw}}$ = defines the initial non-rotated direction of the camera axis that is pendicular to the face of the lens $$R_{zw}(\text{swing angle}) = \begin{bmatrix} \cos(\text{swing angle}) & -\sin(\text{swing angle}) & 0 \\ \sin(\text{swing angle}) & \cos(\text{swing angle}) & 0 \\ 0 & 0 & 1 \end{bmatrix}$$

B. Next, the camera is rotated through the pan angle of the camera head:

$$\overrightarrow{x''_{camw}} = R_{zw}(\text{pan angle}) \times \overrightarrow{x'_{camw}} \quad (3)$$

where:

$$R_{zw}(\text{pan angle}) = \begin{bmatrix} \cos(\text{pan angle}) & -\sin(\text{pan angle}) & 0 \\ \sin(\text{pan angle}) & \cos(\text{pan angle}) & 0 \\ 0 & 0 & 1 \end{bmatrix}$$

C. Lastly, the camera is rotated through the tilt angle of the camera head (three-part calculation):

i. First, the camera axis is rotated so that world Y-axis, $Y_w$, and camera Y-axis, $Y_{camw}$, are parallel, the following equation may be used:

$$\overrightarrow{x'''_{camwA}} = \begin{bmatrix} \overrightarrow{y''_{camw}}(2) & -\overrightarrow{y''_{camw}}(1) & 0 \\ \overrightarrow{y''_{camw}}(1) & \overrightarrow{y''_{camw}}(2) & 0 \\ 0 & 0 & 1 \end{bmatrix} \overrightarrow{x''_{camw}} \quad (4)$$

ii. Second, the camera axis is rotated about the world y-axis, $Y_w$, in amount equal to the tilt angle.

$$\overrightarrow{x'''_{camwB}} = \begin{bmatrix} \cos(\text{tilt angle}) & 0 & -\sin(\text{tilt angle}) \\ 0 & 1 & 0 \\ \sin(\text{tilt angle}) & 0 & \cos(\text{tilt angle}) \end{bmatrix} \overrightarrow{x'''_{camwA}} \quad (5)$$

Third, the camera is rotated back through inverse of step (i) matrix $$\overrightarrow{x'''_{camw}} = \begin{bmatrix} \overrightarrow{y''_{camw}}(2) & -\overrightarrow{y''_{camw}}(1) & 0 \\ \overrightarrow{y''_{camw}}(1) & \overrightarrow{y''_{camw}}(2) & 0 \\ 0 & 0 & 1 \end{bmatrix}^{-1} \overrightarrow{x'''_{camwB}} \quad (6)$$

Consequently, the camera viewing vector:

$\overrightarrow{CVV_{1w}}$ is equal to:

$\overrightarrow{x'''_{camw}}$

These calculations are repeated for the second calibration position of the camera, $\overrightarrow{X_{cam2w}}$, to obtain the second camera viewing vector, $CVV_{2w}$ (called out as 910 in FIG. 5). Consequently, two three-dimensional camera view line equations consisting of a camera position and camera viewing vector may be expressed as:

$Cam1 = \overrightarrow{X_{cam1w}} + t(\overrightarrow{CVV_{1w}})$ $Cam2 = \overrightarrow{X_{cam2w}} + s(\overrightarrow{CVV_{2w}}) \quad (7)$ The intersection of the two calibration lines or closest point thereto (e.g., the midpoint of the shortest distance line segment between the two calibration lines) in three-dimensional space may be calculated as follows. For simplicity, the components of equation (7) will be temporarily renamed as follows:

$\overrightarrow{r1} = \overrightarrow{A} + t(\overrightarrow{B})$ $\overrightarrow{r2} = \overrightarrow{C} + s(\overrightarrow{D}) \quad (8)$ The shortest distance between the two lines can be found with the following equation:

$$d = \frac{(\overrightarrow{C} - \overrightarrow{A}) \cdot \overrightarrow{B} \times \overrightarrow{D}}{|\overrightarrow{B} \times \overrightarrow{D}|} \quad (9)$$

To determine the three-dimensional coordinates of the shortest line segment between $r_1$ and $r_2$, this point is allowed to exist between two points, "m" and "n", on the two lines. The segment mn can be described with equation (8) as:

$$\vec{mn} = (\vec{C} + s\vec{D}) - (\vec{A} + t\vec{B})  \quad (10)$$

Given that the shortest line segment, mn, is perpendicular to both camera view lines $Cam_1$ and $Cam_2$ and therefore $r_1$ and $r_2$ let:

$$\vec{B} \cdot \vec{mn} = 0$$

$$\vec{D} \cdot \vec{mn} = 0 \quad (11)$$

Solving these equations will yield values for "t" and "s".

$$\vec{B} \cdot \vec{mn} = 0$$

$$\vec{B} \cdot [(\vec{C} - \vec{A}) + s\vec{D} - t\vec{B}] = 0$$

$$\vec{B} \cdot (\vec{C} - \vec{A}) + \vec{B} \cdot s\vec{D} - \vec{B} \cdot t\vec{B} = 0$$

$$\vec{B} \cdot (\vec{C} - \vec{A}) + \vec{B} \cdot s\vec{D} - t = 0$$

$$\Rightarrow t = \vec{B} \cdot (\vec{C} - \vec{A}) + s\vec{B} \cdot \vec{D} \quad (12a)$$

Similarly, $$\vec{D} \cdot \vec{mn} = 0$$

$$\vec{D} \cdot [(\vec{C} - \vec{A}) + s\vec{D} - t\vec{B}] = 0$$

$$\vec{D} \cdot (\vec{C} - \vec{A}) + \vec{D} \cdot s\vec{D} - \vec{D} \cdot t\vec{B} = 0$$

$$\vec{D} \cdot (\vec{C} - \vec{A}) + s - \vec{D} \cdot t\vec{B} = 0$$

$$\Rightarrow s = t\vec{D} \cdot \vec{B} - \vec{D} \cdot (\vec{C} - \vec{A}) \quad (12b)$$

Continuing to solve equations (12a) and (12b) for "s" gives:

$$s = \frac{|\vec{B} \cdot (\vec{C} - \vec{A})||\vec{D} \cdot \vec{B}| - \vec{D} \cdot (\vec{C} - \vec{A})}{1 - (\vec{B} \cdot \vec{D})^2} \quad (13)$$

Solving equation (13) and then solving equation (12a) gives "s" and "t" for the shortest line segment. Camera target position or subject matter is estimated as the midpoint of segment mn:

$$X_s = \begin{bmatrix} (x_m + x_n)/2 \\ (y_m + y_n)/2 \\ (z_m + z_n)/2 \end{bmatrix} \quad (14)$$

The subject matter 500 position is thus defined within the processing system 440 as $X_s$.

Figure 6:
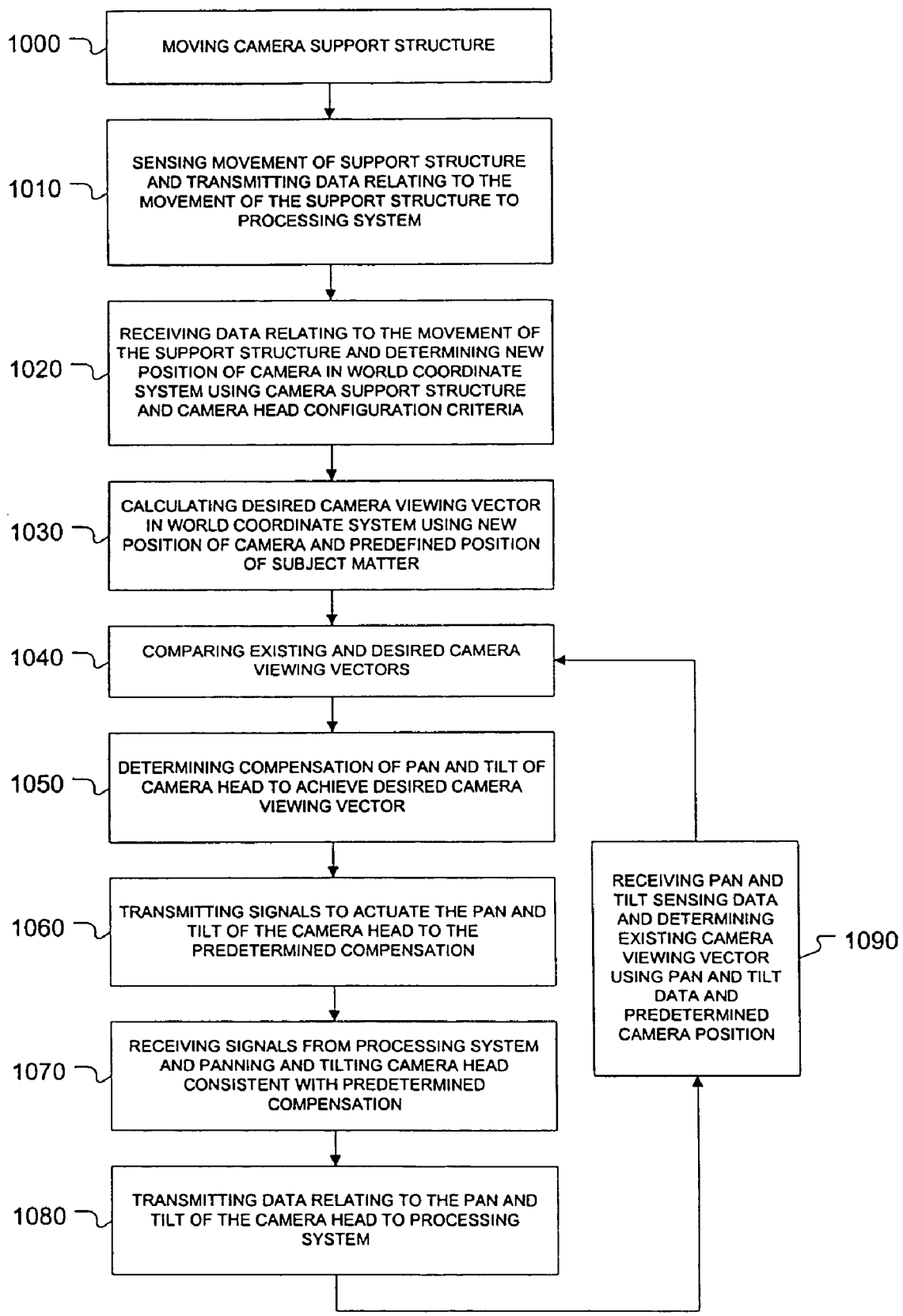
FIG. 6 is a flow chart detailing preferred steps for the compensation of pan and tilt for the movements of a camera support structure in accordance with the preferred automatic pan and tilt compensation control system architecture illustrated in FIGS. 3, 12, and 15.
Figure 12:
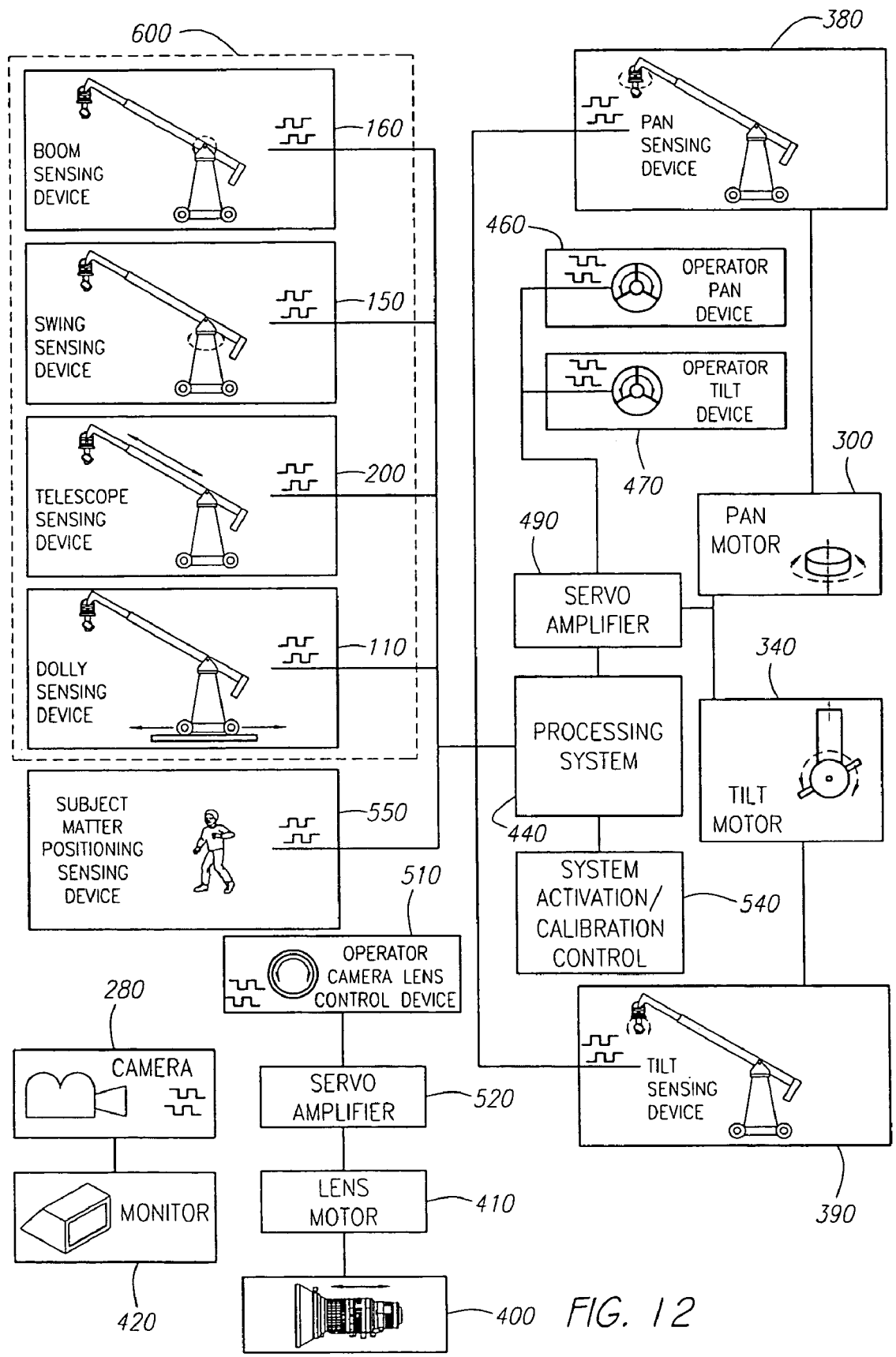
FIG. 12 is a block diagram illustrating a second preferred automatic pan and tilt compensation control system architecture capable of being used in connection with the camera positioning system illustrated in FIG. 1.
Figure 15:
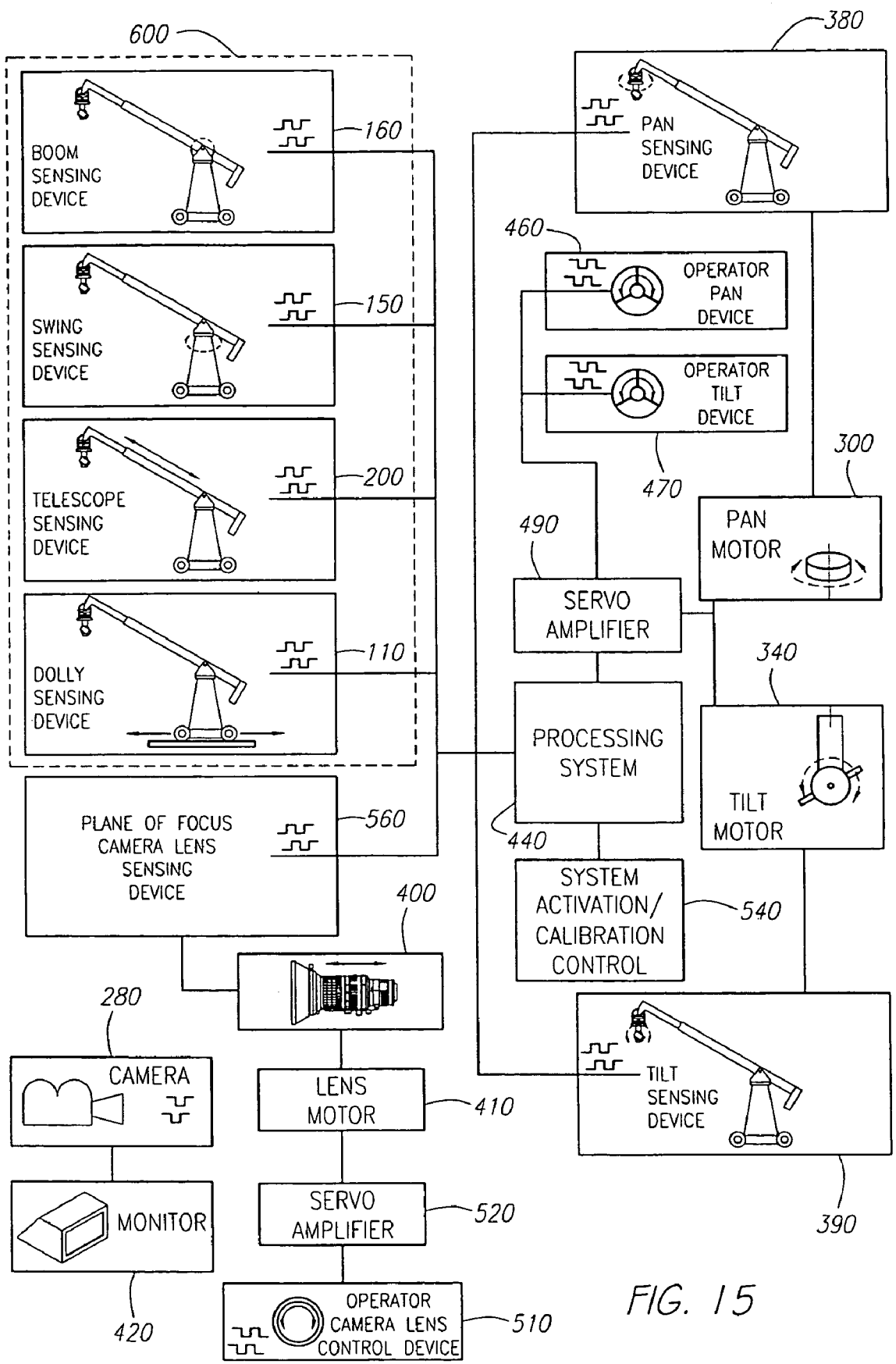
FIG. 15 is a block diagram illustrating a third preferred automatic pan and tilt compensation control system architecture capable of being used in connection with the camera positioning system illustrated in FIG. 1.

FIG. 6 illustrates a flow chart detailing preferred steps for the compensation of pan and tilt for the movements of the camera support structure 20 in accordance with the preferred automatic pan and tilt compensation control system architectures illustrated in FIGS. 3, 12 and 15. As shown in FIG. 6, once movement of the camera support structure 20 occurs (step 1000) the camera support structure sensing device(s) 600 sense movement of the support structure 20 and transmit data relating to the movement of the support structure to the processing system 440 (step 1010). Similar to that of step 730 previously discussed, the processing system 440 receives the data from the camera support structure sensing device(s) 600 and determines from sensor data the new position of the camera in the world coordinate system using camera support structure and camera head configuration criteria (step 1020). The processing system 440 then calculates the desired camera viewing vector in the world coordinate system using the new position of the camera and the predefined position of the subject matter 500 (step 1030). The processing system 440 then compares the existing and desired camera viewing vectors (step 1040) and determines the compensation of pan and tilt of the camera head 270 to achieve the desired camera viewing vector (step 1050). The processing system 440 then sends signals to the servo amplifier 490 to actuate the pan and tilt of the camera head to the predetermined compensation (step 1060). The camera head 270 receives the signals from the processing system 440 and the pan and/or tilt motors, 300, 340 pan and tilt the camera head consistent with the predetermined compensation (step 1070). Employing a standard feed back loop configuration, the pan and tilt sensing devices 380, 390 transmit data to the processing system 440 relating to the pan and tilt of the camera head 270 (step 1080). The processing system 440 receives the data transmitted from the pan and tilt sensing devices 380, 390 and determines the existing camera viewing vector using the pan and tilt sensing device data and the predetermined camera position (step 1090). Steps 1040 through 1090 are repeated until the existing camera viewing vector is the same as the desired camera viewing vector. Pan and tilt compositional adjustments by the camera operator via the operator pan and tilt devices 460, 470 are preferably taken into account in determining the appropriate pan and tilt compensation of the camera head 270.

Figure 7A:
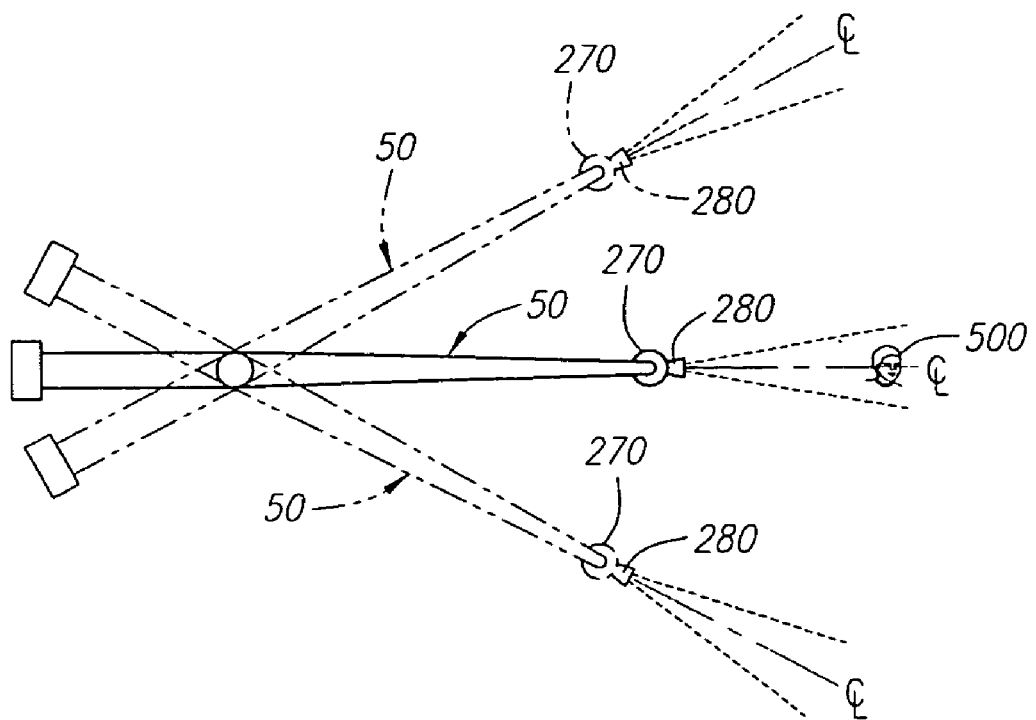
FIG. 7A is a top plan view of a camera support structure depicting the field of view of the camera without camera head pan compensation for changes in the swing angle of the camera crane arm.
Figure 7B:
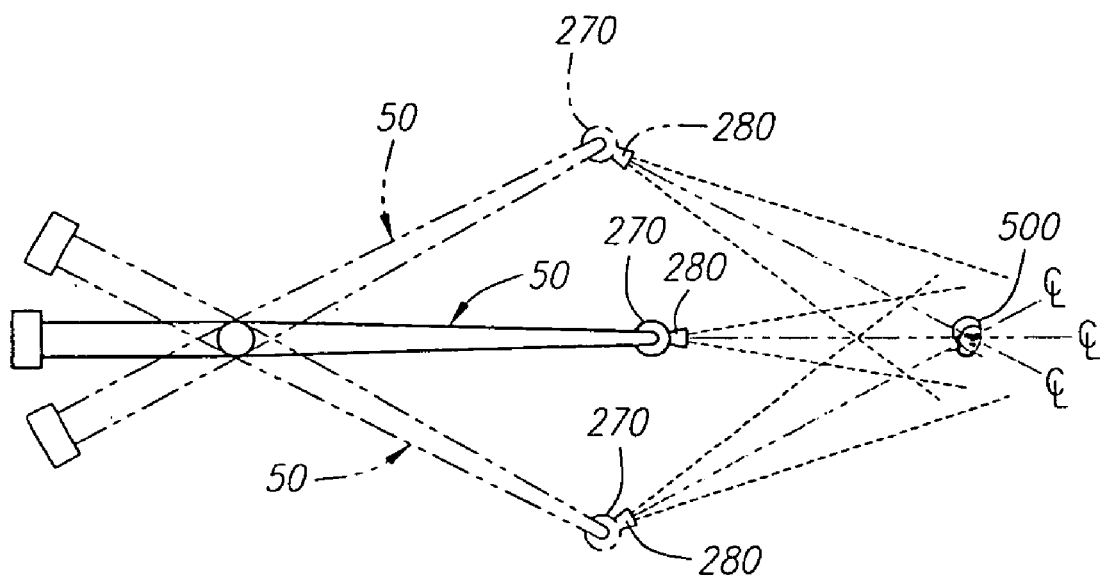
FIG. 7B is a top plan view of a camera support structure depicting the field of view of the camera with camera head pan compensation for changes in the swing angle of the camera crane arm.
Figure 8A:
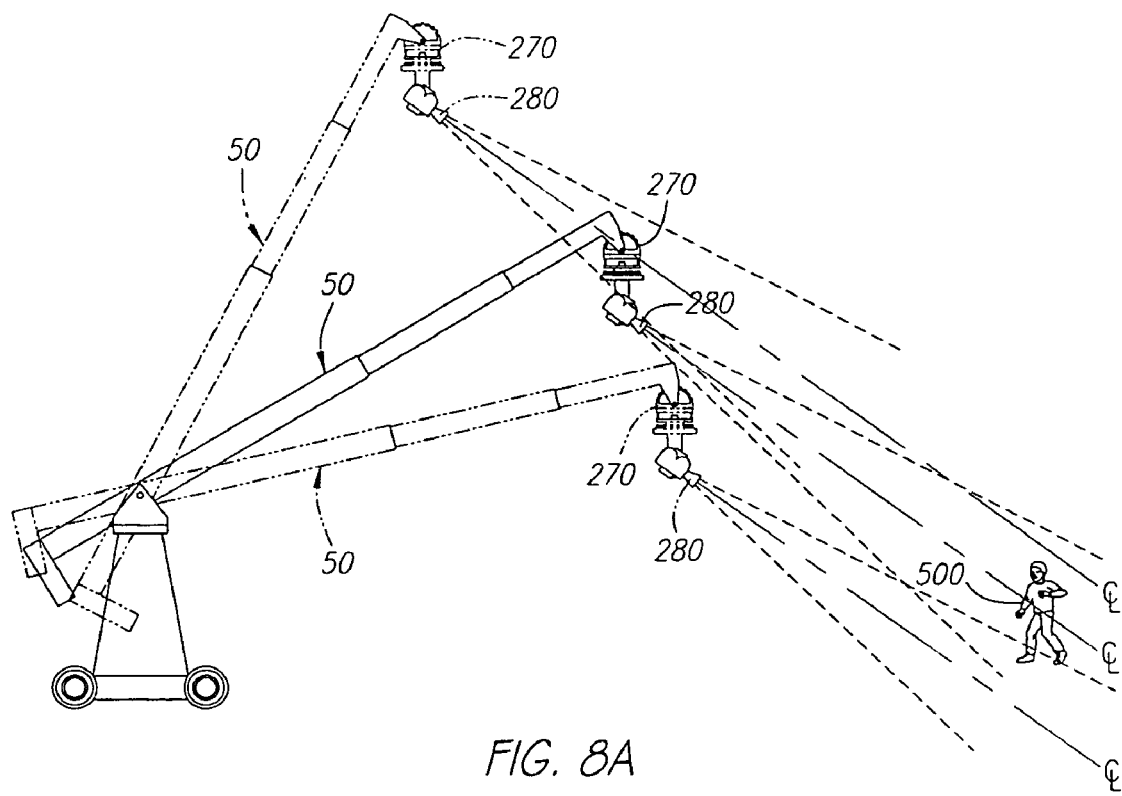
FIG. 8A is a side view of a camera support structure depicting the field of view of the camera without camera head tilt compensation for changes in the boom angle of the camera crane arm.
Figure 8B:
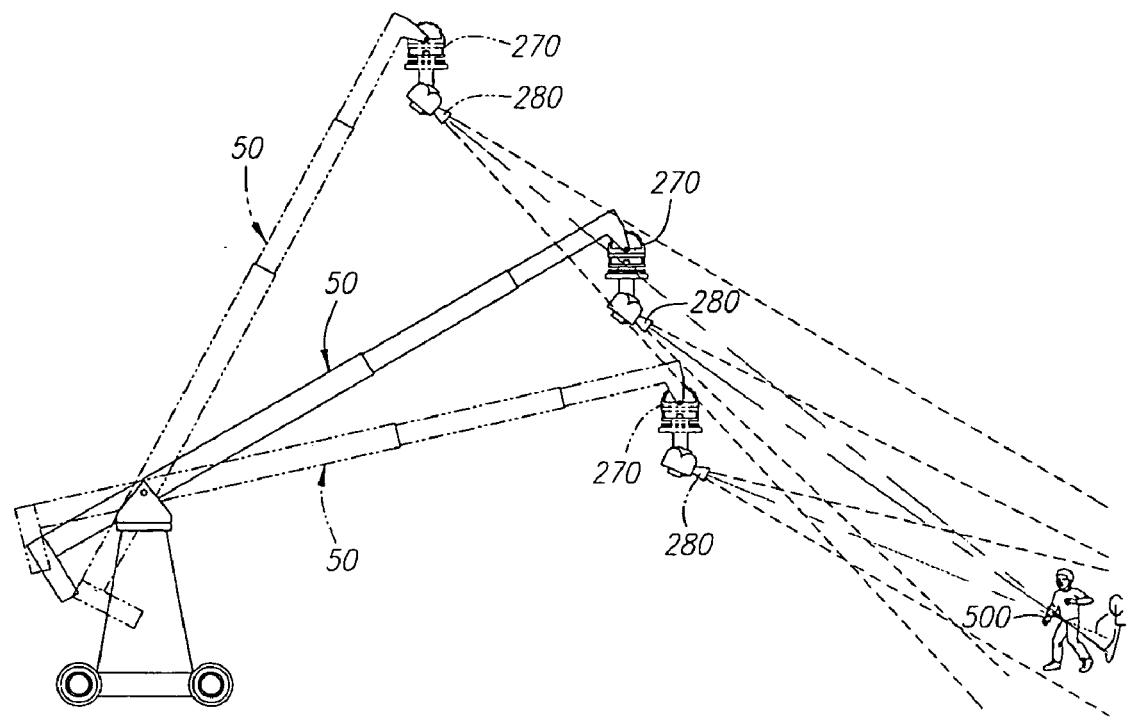
FIG. 8B is a side view of a camera support structure depicting the field of view of the camera with camera head tilt compensation for changes in the boom angle of the camera crane arm.

The operation of the automatic pan and tilt compensation system 10 with respect to movements or change in position of the camera support structure 20 are illustrated in FIGS. 7A and 7B and 8A and 8B. As illustrated in FIG. 7A without automatic pan compensation (e.g., the system is in the unactivated state) for changes in the movement of the camera support structure 20 such as the swing of the camera crane arm 50, the subject matter 500 does not remain centered within the field of view of the camera 280. In contrast, as illustrated in FIG. 7B with automatic pan compensation the centerline of the field of view of the camera 280 remains fixed on the subject matter 500 when the camera support structure 20 moves. Similarly, as illustrated in FIG. 8A without automatic tilt compensation for changes in the movement of the camera support structure 20 such as the boom of the camera crane arm 50, the subject matter 500 does not remain centered within the field of view of the camera 280. In contrast, as illustrated in FIG. 8B with automatic tilt compensation the centerline of the field of view of the camera 280 remains fixed on the subject matter 500 when the camera support structure 20 moves.

Figure 9:
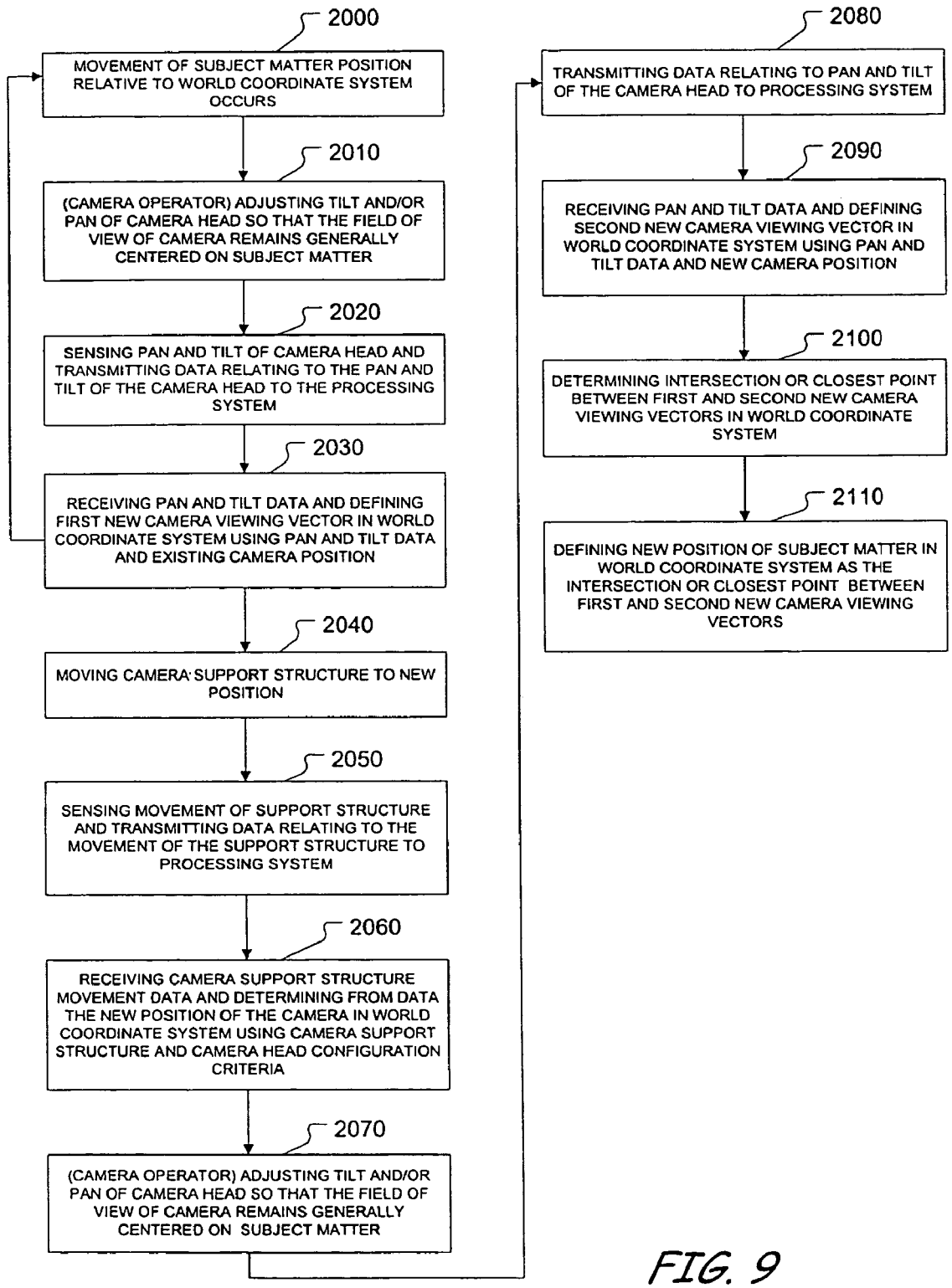
FIG. 9 is a flow chart detailing preferred steps for the compensation of pan and tilt for the movements of a subject matter in accordance with the first preferred automatic pan and tilt compensation control system architecture illustrated in FIG. 3.

FIG. 9 illustrates a flow chart detailing preferred steps for the compensation of pan and tilt for the movements of a subject matter in accordance with the preferred automatic pan and tilt compensation control system architecture illustrated in FIG. 3. As shown in FIG. 9, once the subject matter 500 changes position relative to the world coordinate system (step 2000), the camera-operator adjusts via the camera-operator pan and tilt compensation devices 460, 470 the tilt and/or pan of the camera head 270 so that the field of view of the camera 280 is generally centered on the subject matter 500 (step 2010). After adjustment of the pan and tilt, the camera operator via the system activation/calibration control 540 may in a preferred implementation set or indicate to the processing system 440 that the adjustment of the pan and tilt reflects a change in position or movement of the subject matter 500. Such a preferred implementation may better facilitate the camera operator's pan and tilt adjustments of the camera head 270 for purposes of fashioning the composition of the shot without redefining the position of the subject matter vis-à-vis the processing system 440. The pan and tilt sensing devices 380, 390 transmit data to the processing system 440 relating to the pan and tilt of the camera head 270 (step 2020). The processing system 440 receives the data and defines a first new camera viewing vector in world coordinates system using the data from pan and tilt sensing devices 380, 390 and existing camera position (step 2030). With every change in the subject matter position, steps 2000 through 2030 are repeated and a first new camera viewing vector is calculated. Upon movement of the camera support structure 20 to a new position (step 2040), the camera support structure sensing device(s) 600 senses the movement of the support structure 20 and transmits data relating to the movement of the support structure 20 to the processing system 440 (step 2050). Similar to step 730, the processing system receives the movement data from the support structure sensing device(s) 600 and determines from the sensor data the new position of the camera 280 in world coordinate system using camera support structure 20 and camera head 270 configuration criteria (step 2060). The camera-operator again adjusts via the camera-operator pan and tilt compensation devices 460, 470 the pan and tilt of the camera head 270 so that the field of view of the camera 280 is generally centered on the subject matter 500 (step 2070). This step is similar to that of step 740. Also, in similar fashion as that previously described, after the support structure 20 is positioned at the new calibration position and the pan and tilt is adjusted by the camera operator, the camera operator via the system activation/calibration control 540 may in a preferred implementation set the new calibration position in the processing system 440 thereby affirmatively identifying the new calibration position for employment by the processing system 440. The pan and tilt sensing devices 380, 390 transmit position data relating to the pan and tilt of the camera head 270 to the processing system 440 (step 2080) which then defines the second new camera viewing vector in world coordinate system using the data from the pan and tilt sensing devices 380, 390 and the new camera position (step 2090). Once the processing system 440 has calculated the first and second new camera viewing vectors, the processing system 440 determines the intersection or closest point between first and second new camera viewing vectors in world coordinates system (step 2100) and defines the new position of the subject matter 500 as the intersection or closest point between the first and second new camera viewing vectors (step 2110). The new subject matter 500 position is now defined within the processing system 440 and is used in step 1030 in calculating the desired camera viewing vector for the movements of the camera support structure as previously described in relation to FIG. 6.

Figure 10A:
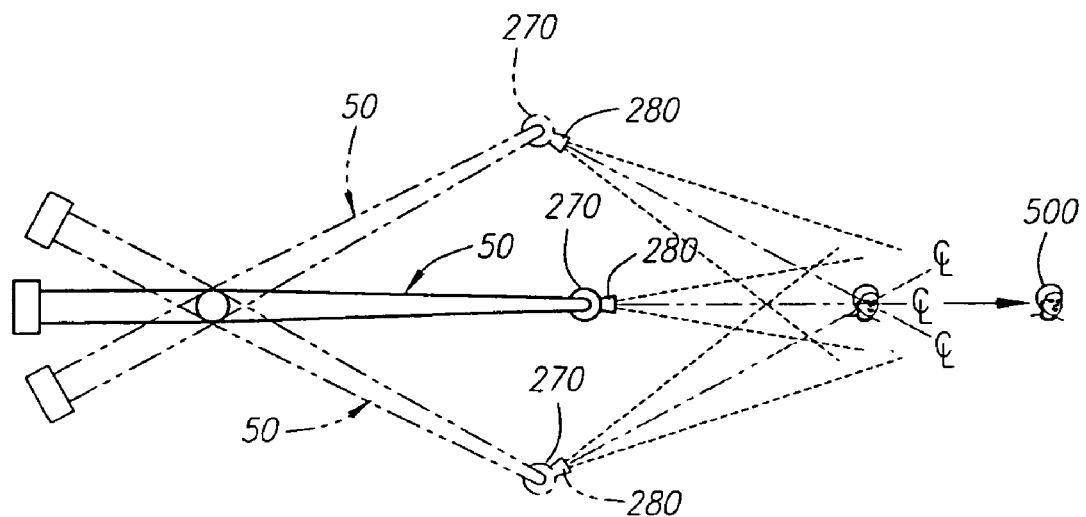
FIG. 10A is a top plan view of a camera support structure depicting the field of view of the camera with camera head pan compensation for changes in the swing angle of the camera crane arm but without camera head pan compensation for the movements of a subject matter.
Figure 10B:
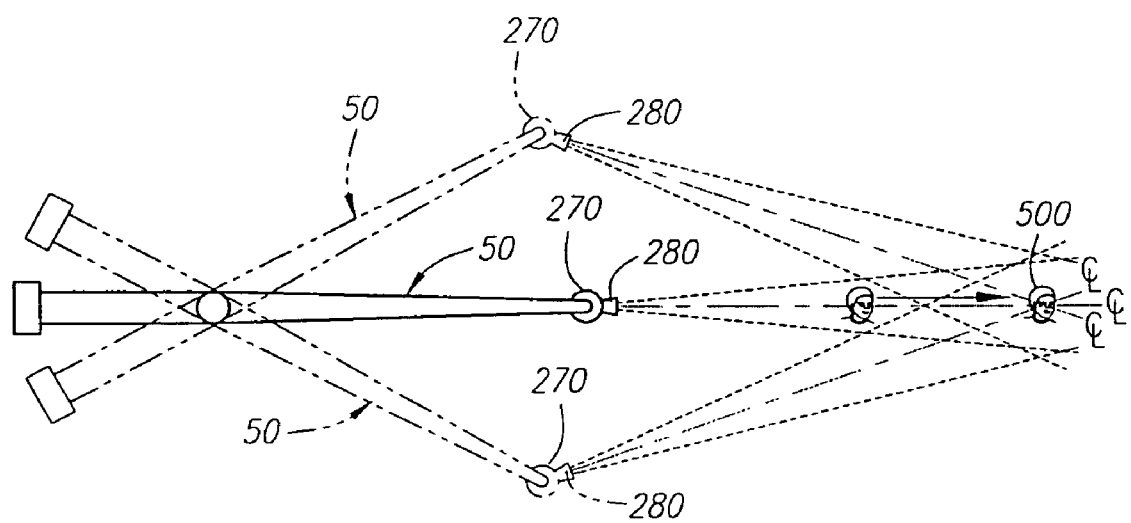
FIG. 10B is a top plan view of a camera support structure depicting the field of view of the camera with camera head pan compensation for the movements of a subject matter and for changes in the swing angle of the camera crane arm.
Figure 11A:
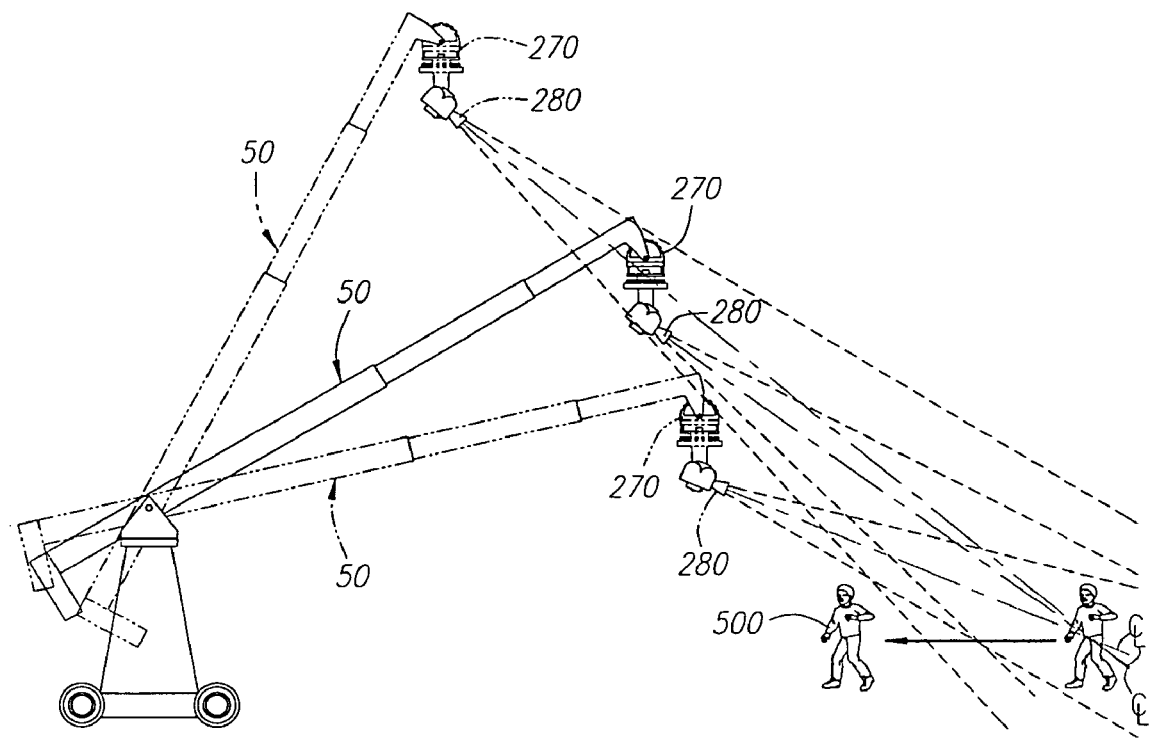
FIG. 11A is a side view of a camera support structure depicting the field of view of the camera with camera head tilt compensation for changes in the boom angles of the camera crane arm but without camera head tilt compensation for the movements of a subject matter.
Figure 11B:
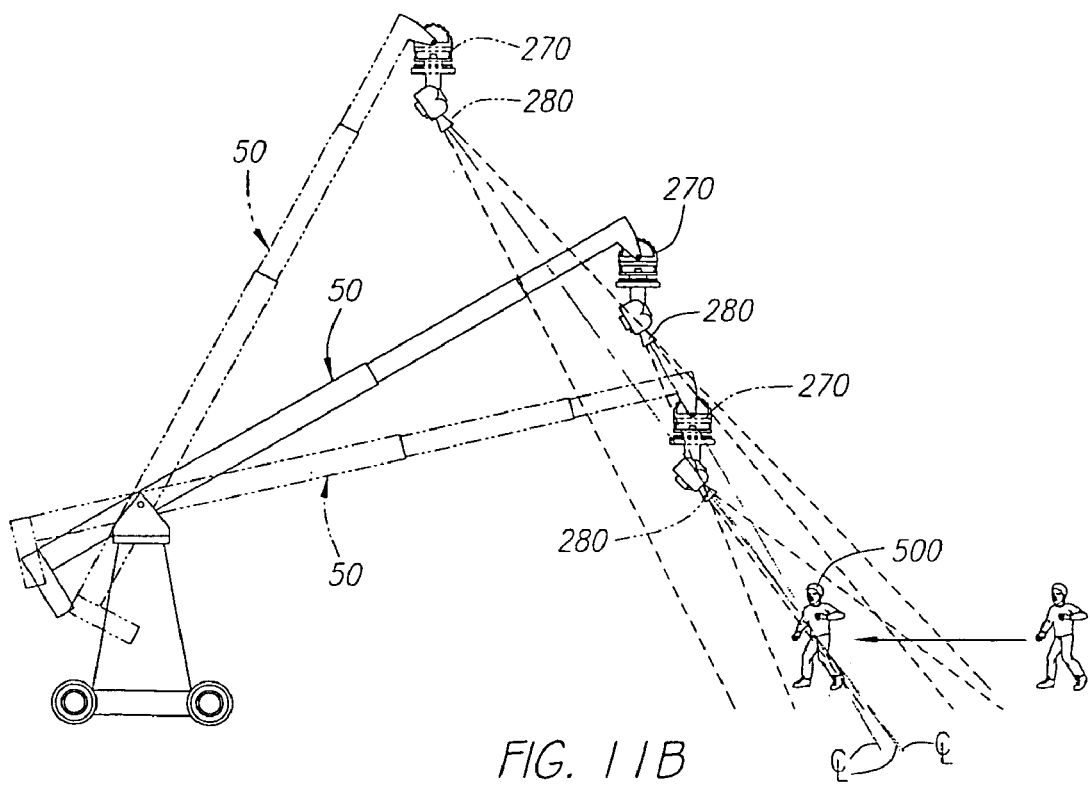
FIG. 11B is a side view of a camera support structure depicting the field the view of the camera with camera head tilt compensation for the movements of a subject matter and for changes in the boom angle of the camera crane arm.

The operation of the automatic pan and tilt compensation system 10 with respect to movements of the subject matter 500 are illustrated in FIGS. 10A and 10B and 11A and 11B. As illustrated in FIG. 10A without automatic pan compensation for changes in the movement of the subject matter 500, when the camera crane arm 50 swings, the subject matter 500 at its new position does not remain centered within the field of view of a camera 280. In contrast, as illustrated in FIG. 10B with automatic pan compensation the field of view of the camera 280 remains centered on the new position of the subject matter 500 when the camera support structure 20 moves. Similarly, as illustrated in FIG. 11A without automatic tilt compensation for changes in the movement of the subject matter 500, when the camera crane arm 50 boom changes, the subject matter 500 does not remain centered within the field of view of a camera 280. In contrast, as illustrated in FIG. 11B with automatic tilt compensation the field of view of the camera 280 remains centered on the new position of the subject matter 500 when movement in the camera support structure 20 occurs.

FIG. 12 is a block diagram illustrating a second preferred automatic pan and tilt compensation control system architecture capable of being used in connection with the camera positioning system illustrated in FIG. 1. The description of the diagram of FIG. 12 is substantially the same as that of FIG. 3 with one primary difference. A subject matter positioning sensing device 550 (also shown in phantom in FIG. 1) monitors the position or movement of the subject matter 500 and communicates information relating to the movement/position of the subject matter 500 to the processing system 440 via suitable communications means. The subject matter positioning sensing device 550 may be comprised of a device that is capable of providing data regarding the position or movement of the subject matter relative to a defined coordinate system. For example, the positioning sensing device may be comprised of a GPS device, such as a GPS TracPak manufactured by GARMIN International, Inc. of Olathe, Kans., or a laser positioning device such as a Vulcan manufactured by ArcSecond, Inc. of Dulles, Va., or perhaps a radar device.

Figure 13:
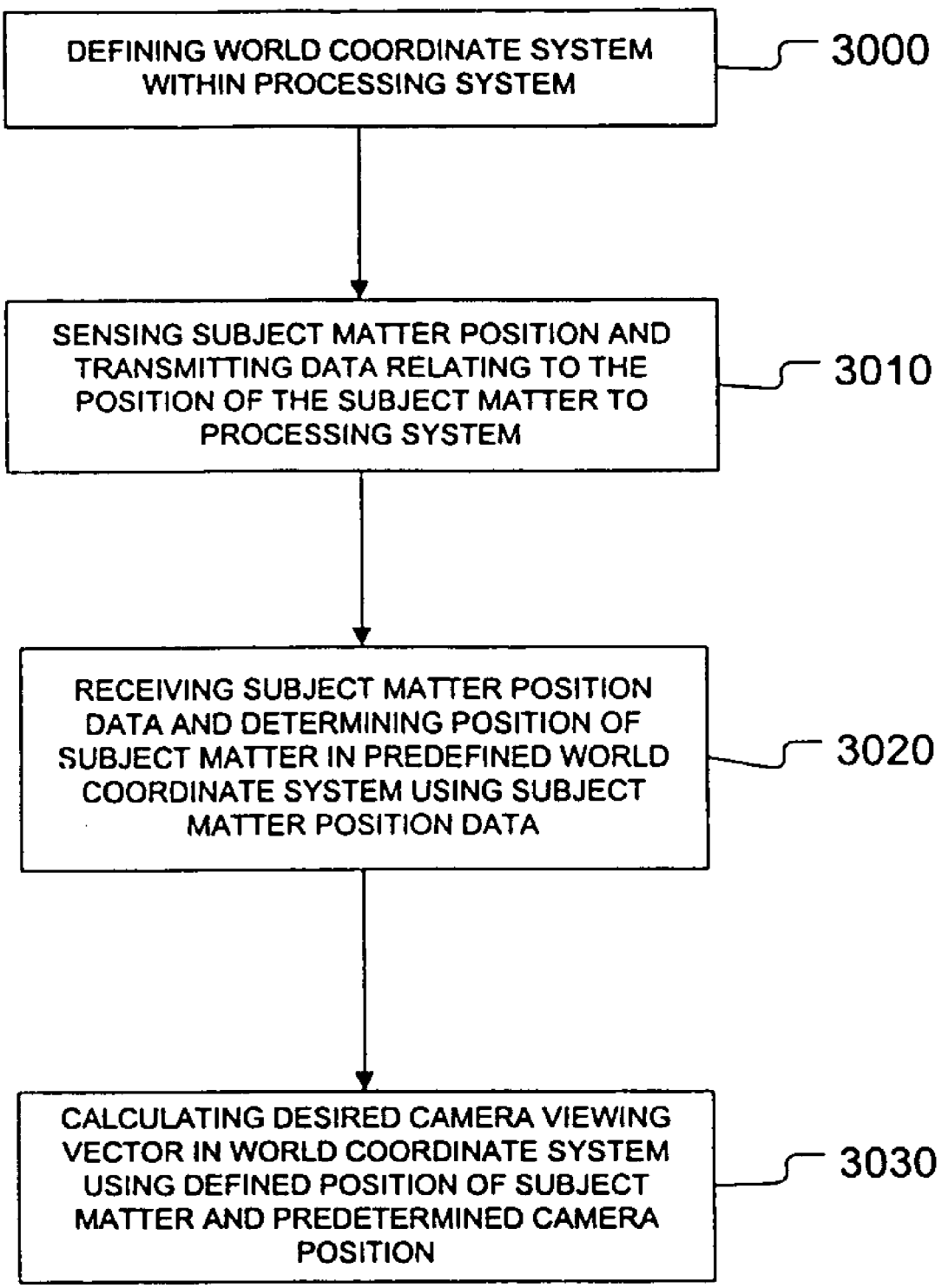
FIG. 13 is a flow chart detailing preferred steps for defining the position of a subject matter relative to a defined world coordinate system in accordance with the second preferred automatic pan and tilt compensation control system architecture illustrated in FIG. 12.

FIG. 13 illustrates a flow chart detailing preferred steps for defining the position of a subject matter relative to the defined world coordinate system in accordance with the second preferred automatic pan and tilt compensation control system architecture illustrated in FIG. 12. As shown in FIG. 13, defined within the processing system 440, as in step 700, is the world coordinate system (step 3000). Once defined, the subject matter positioning sensing device 550 sends data to the processing system 440 relating to the position of the subject matter 500 (step 3010). The processing system 440 receives the signals from the subject matter positioning device 550 and correlates or determines from the data the position of the subject matter 500 in relation to the predefined world coordinate system (step 3020). It is to be understood that the determination of the subject matter 500 need not be the exact physical position of the subject matter sensing device 550, but rather may be offset a defined distance and direction from the sensing device 550. For example, if the subject matter 500 is a person, the sensing device may be located in a purse carried by the person, yet the operative subject matter 500 would nonetheless be correlated to the person. This may facilitate additional versatility in the placement of the subject matter sensing device 550. After step 3020, the processing system 440 calculates the desired camera viewing vector in world coordinate system using the newly defined position of the subject matter 500 and the predetermined camera position (step 3030), which is determined by the processing system 440 from the sensing device(s) 600 data with reference to the camera support structure 20 and camera head 270 configuration criteria as previously described. The new subject matter 500 position is now defined within the processing system 440 and is used in step 1030 in calculating the desired camera viewing vector for the movements of the camera support structure 20 as previously described in relation to FIG. 6.

Figure 14:
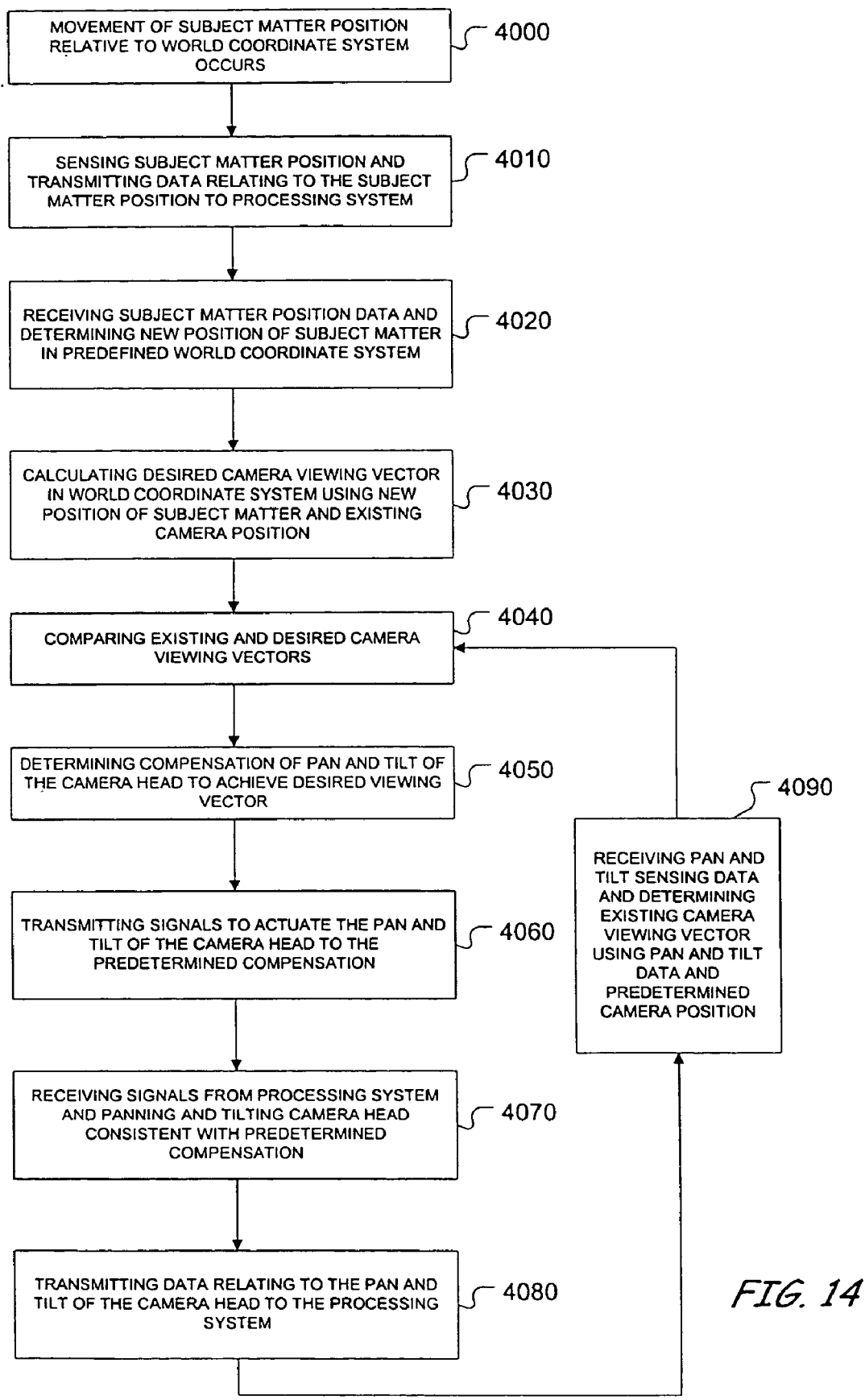
FIG. 14 is a flow chart detailing preferred steps for the compensation of pan and tilt for the movements of a subject matter in accordance with the second preferred automatic pan and tilt compensation control system architecture illustrated in FIG. 12.

FIG. 14 illustrates a flow chart detailing preferred steps for the compensation of pan and tilt for the movements of a subject matter in accordance with the second preferred automatic pan and tilt compensation control system architecture illustrated in FIG. 12. As shown in FIG. 14, once the subject matter 500 moves or changes position relative to the world coordinate system (step 4000), the subject matter position sensing device 550 sends signals to the processing system 440 relating to the new position of the subject matter 500 (step 4010). The processing system 440 receives the signals from the subject matter positioning sensing device 550 and determines new position of the subject matter 500 in predefined world coordinate system (step 4020) and calculates the desired camera viewing vector in world coordinate system using the new position of the subject matter 500 and the existing position of the camera 280 (step 4030), which is determined by the processing system 440 from the sensing device(s) 600 data with reference to the camera support structure 20 and camera head 270 configuration criteria as previously described. The remaining steps 4040 to 4090 are similar to steps 1040 through 1090 previously described in relation to FIG. 6. Namely, the processing system 440 then compares the existing and desired camera viewing vectors (step 4040) and determines the compensation of pan and tilt of the camera head 270 to achieve the desired camera viewing vector (step 4050). The processing system 440 then sends signals to the servo amplifier 490 to actuate the pan and tilt of the camera head to the predetermined compensation (step 4060). The camera head 270 receives the signals from the processing system 440 and the pan and/or tilt motors, 300, 340 pan and tilt the camera head consistent with the predetermined compensation (step 4070). Employing a standard feed back loop configuration, the pan and tilt sensing devices 380, 390 transmit data to the processing system 440 relating to the pan and tilt of the camera head 270 (step 4080). The processing system 440 receives the data transmitted from the pan and tilt sensing devices 380, 390 and determines the existing camera viewing vector using the pan and tilt sensing device data and the predetermined camera position (step 4090). Steps 4040 through 4090 are repeated until the existing camera viewing vector is consistent with the desired camera viewing vector. It is to be understood that this system architecture may be employed to automatically compensate the pan and tilt of a camera head for the movements of a subject matter 500 without need of movement of the camera support structure 20 or additional input by the camera operator to define the new position of the subject matter within the system. Thus, it is contemplated that this system architecture may be employed for stationary camera support structures as well as for camera support structures capable of movement with one or more degrees of freedom.

It is further contemplated that one or more subject matter sensing devices may be employed. For example, there may be multiple subjects being filmed in which one or more of the subjects may each be monitored by a subject matter positioning sensing device 550. How the data from the multiple subject matter positioning sensing devices 550 is correlated within the processing system 440 is a matter of design choice. For example, the position of the subject matter defined in the processing system 440 for purposes of panning and tilting the camera head may be defined by the position of a single subject matter or it may be defined as a weighted average or mid-point between multiple subject matters. Moreover, the system may be designed to simultaneously or intermittently track one or more subject matters 500 and allow the user or camera operator to determine at any given time during or prior to filming which subject matter 500 the system is to "track" or compensate the pan and tilt of the camera head for.

FIG. 15 is a block diagram illustrating a third preferred automatic pan and tilt compensation control system architecture capable of being used in connection with the camera positioning system illustrated in FIG. 1. The description of the diagram of FIG. 15 is substantially the same as that of FIG. 3 with one primary difference. A plane of focus camera lens sensing device 560 (shown in FIG. 2) is employed to monitor the plane of focus of the camera lens 400 and communicate information relating to the plane of focus of the camera lens 400 to the processing system 440 via suitable communications means. In the preferred embodiment illustrated in FIGS. 1 and 2, the camera lens plane of focus sensing device 560 may be comprised of device that is capable of providing data relating to the distance from the camera lens in which the camera lens 400 is in optimum focus such as a Panatape ultrasonic based device manufactured by Panavision Corporation of the United States of America, which monitors the drive mechanism of the lens motor 410 and transmits electrical signals relating to the plane of focus of the camera lens 400 to the processing system 440 via electrical cable 530.

Figure 16:
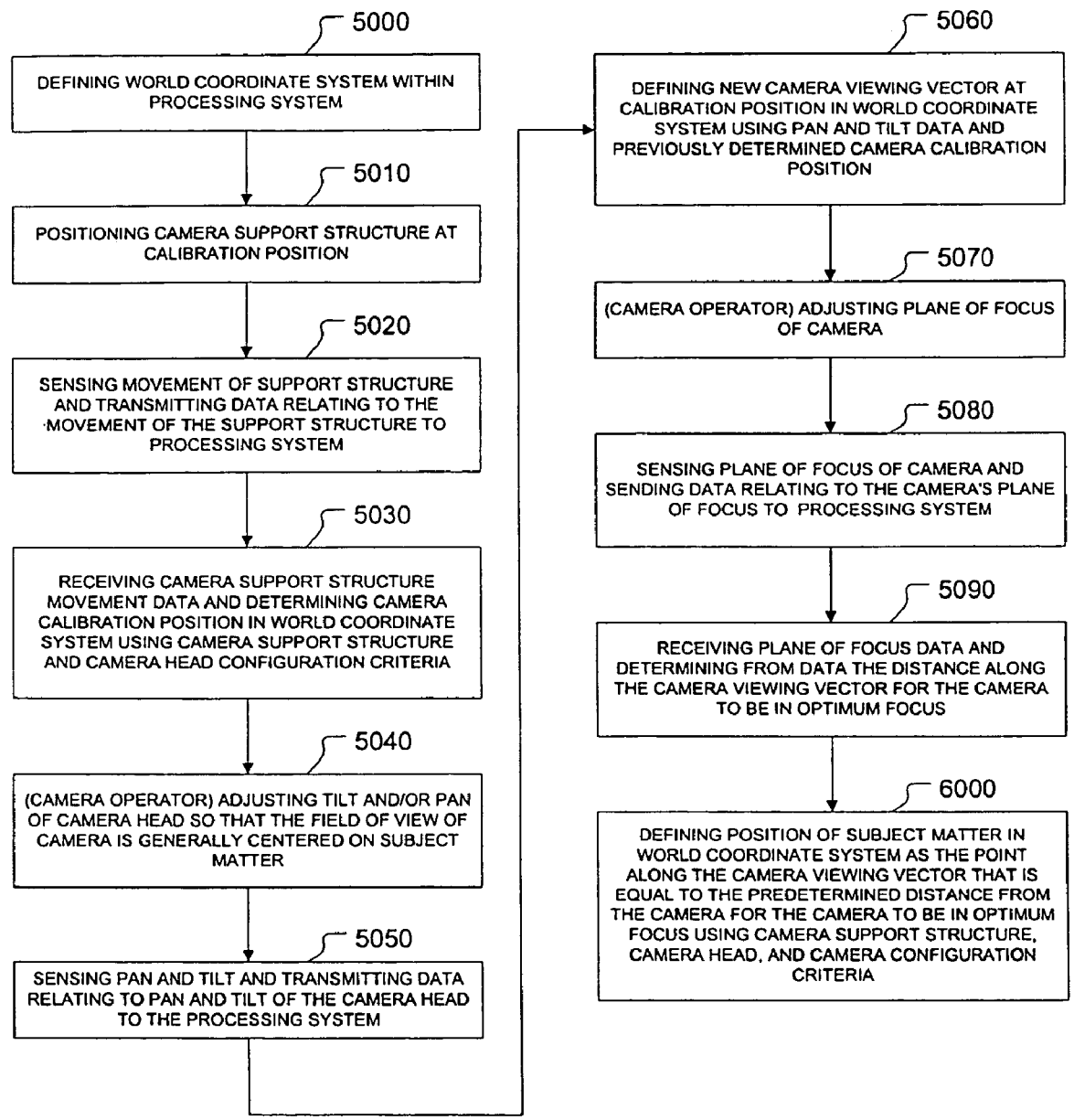
FIG. 16 is a flow chart detailing preferred steps for defining the position of a subject matter relative to a defined world coordinate system in accordance with the third preferred automatic pan and tilt compensation control system architecture illustrated in FIG. 15.

FIG. 16 illustrates a flow chart detailing preferred steps for defining the position of a subject matter relative to the defined world coordinate system in accordance with the third preferred automatic pan and tilt compensation control system architecture illustrated in FIG. 15. Many of the initial steps set forth in FIG. 16 are analogous with the initial steps illustrated and described in relation with FIG. 4. The later steps are different in that the plane of focus sensing device 560 removes the need to add a second camera calibration position as described in relation with FIG. 4. As shown in FIG. 16, defined within the processing system 440 is the world coordinate system (step 5000). Once defined, the camera support structure 20 is positioned at a calibration position (step 5010). The camera support structure sensing device(s) 600 senses movement, if any, (e.g., change in boom, swing, telescope, dolly) of the support structure 20 and transmits data relating to the movement of the support structure 20 to the processing system 440 (step 5020). The processing system 440 receives movement data from the camera support structure sensing device(s) 600 and determines from the data, as in step 730, the camera calibration position using camera support structure 20 and camera head 270 configuration criteria (step 5030). Once the camera support structure 20 is positioned at the calibration position, the camera-operator adjusts the pan and tilt of the camera head 270 via the camera-operator pan and tilt compensation devices 460, 470 so that the field of view of the camera is generally centered on the subject matter 500 (step 5040). The pan and tilt sensing devices 380, 390 transmit to the processing system 440 data relating to the pan and tilt of the camera head 270 (step 5050). The processing system 440 receives the data from the pan and tilt sensing devices 380, 390 and defines an initial camera viewing vector (called out as 900 in FIG. 5) for the calibration position in the world coordinate system using data from pan and tilt sensing devices 380, 390 and previously determined calibration position (step 5060). As was previously described, after the support structure 20 is positioned at the first calibration position, the camera operator via the system activation/calibration control 540 may in a preferred implementation set the calibration position in the processing system 440 and thereby affirmatively identify the calibration position that the operator wishes the processing system 440 to employ.

Unlike the steps set forth in relation to FIG. 4, rather than the camera support structure 20 being positioned at a second calibration position and the process repeated (i.e., steps 770–825 of FIG. 4), the camera-operator instead adjusts the plane of focus for the camera 280 via the remote camera lens control device 510 (step 5070). The plane of focus camera sensing device 560 sends data relating to the camera's plane of focus to the processing system 440 (step 5080). The processing system 440 receives the plane of focus data and determines from the data the distance along the camera viewing vector (e.g., vector 900 illustrated in FIG. 5) for the camera 280 to be optimally focused (step 5090). Upon adjustment of the plane of focus of the lens, the camera operator via the system activation/calibration control 540 may in a preferred implementation set the calibration of the plane of focus in the processing system 440 and thereby affirmatively define the calibration plane of focus that the operator wishes the processing system 440 to employ. Such a preferred implementation may further facilitate the camera operators control in fashioning the desired composition of the shot without redefining the position of the subject matter 500 vis-à-vis the processing system 440. Lastly, the processing system 440 defines the position of the subject matter 500 in the world coordinate system as the point along the camera viewing vector equal to the predetermined distance from the camera 280 for the camera to be in optimum focus using camera support structure 20, camera head 270, and camera 280 configuration criteria (step 6000). The subject matter 500 position is now defined within the processing system 440 and may be used in step 1030 in calculating the desired camera viewing vector for the movements of the camera support structure 20 as previously described in relation to FIG. 6.

Figure 17:
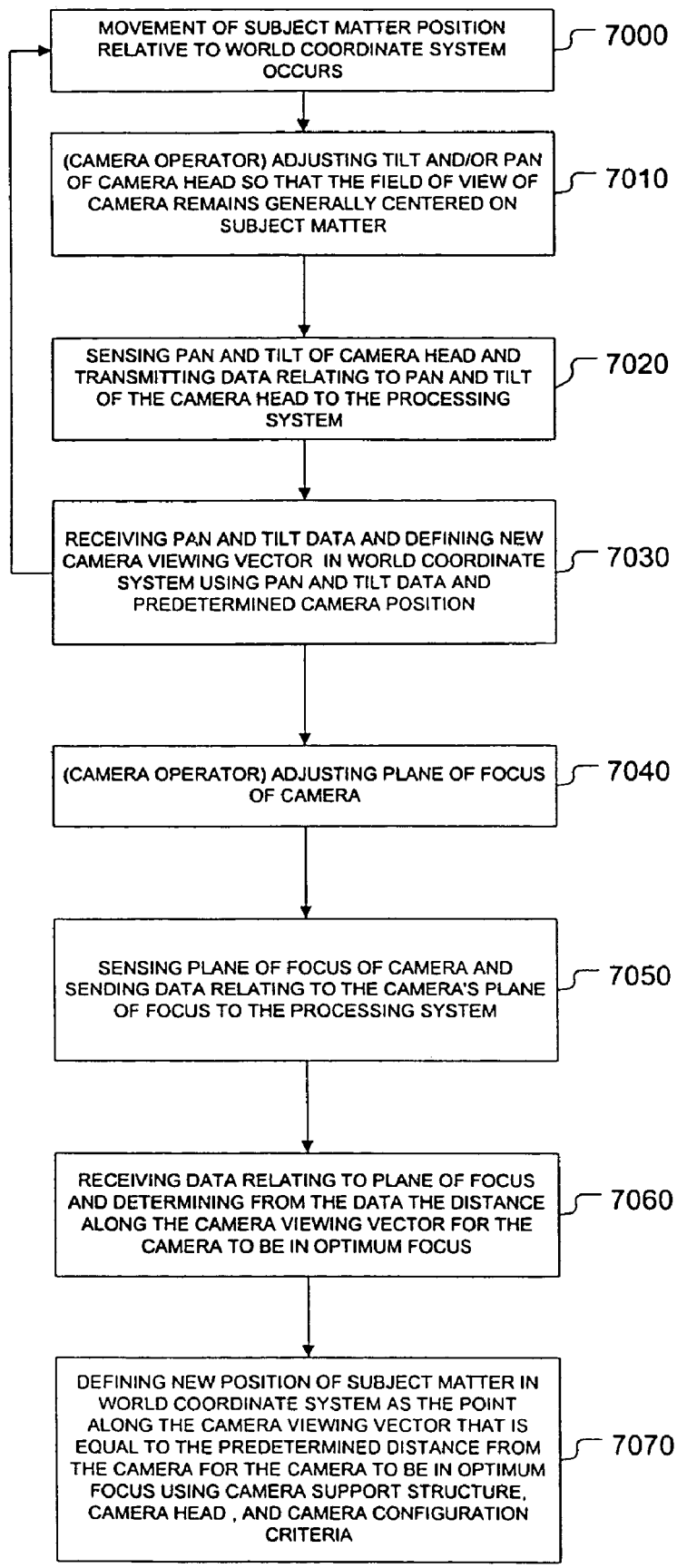
FIG. 17 is a flow chart detailing preferred steps for the compensation of pan and tilt for the movements of a subject matter in accordance with the third preferred automatic pan and tilt compensation control system architecture illustrated in FIG. 15.

FIG. 17 illustrates a flow chart detailing preferred steps for the compensation of pan and tilt for the movements of a subject matter in accordance with the third preferred automatic pan and tilt compensation control system architecture illustrated in FIG. 15. Many of the initial steps set forth in FIG. 17 are analogous with the initial steps illustrated and described in relation with FIG. 9 of the first preferred control system architecture. The later steps are different in that the plane of focus sensing device 560 removes the need for the camera support structure 20 to be moved to a new position prior to the processing system 440 determining the new position of the subject matter 500. As shown in FIG. 17, once the subject matter 500 changes position relative to the world coordinate system (step 7000), the camera-operator adjusts the tilt and/or pan of the camera head 270 via the camera-operator pan and tilt compensation devices 460, 470 so that the field of view of the camera 280 is generally centered on the subject matter 500 (step 7010). As was previously described, after adjustment of the pan and tilt, the camera operator via the system activation/calibration control 540 may in a preferred implementation set or indicate to the processing system 440 that the adjustment of the pan and tilt reflects a change in position or movement of the subject matter 500. Such a preferred implementation may better facilitate the camera operator's pan and tilt adjustments of the camera head 270 for purposes of fashioning the composition of the shot without redefining the position of the subject matter vis-à-vis the processing system 440. The pan and tilt sensing devices 380, 390 transmit data to the processing system 440 relating to the pan and tilt of the camera head 270 (step 7020). The processing system 440 receives the data and defines a new camera viewing vector with respect to the world coordinates system using the data from pan and tilt sensing devices 380, 390 and existing camera position (step 7030). With every change in the subject matter's position, steps 7000 through 7030 are repeated and the new camera viewing vector is calculated. Upon movement of the subject matter 500 to a new position (step 7000), the camera-operator adjusts the plane of the camera 280 if necessary via the remote camera lens control means 510 (step 7040). As was previously described, upon adjustment of the plane of focus of the lens, the camera operator via the system activation/calibration control 540 may in a preferred implementation set the calibration of the plane of focus in the processing system 440 and thereby affirmatively define the calibration plane of focus that the operator wishes the processing system 440 to employ. Such a preferred implementation may further facilitate the camera operators control in fashioning the desired composition of the shot without redefining the position of the subject matter 500 vis-à-vis the processing system 440. The plane of focus camera sensing device 560 sends data relating to the camera's plane of focus to the processing system 440 (step 7050). The processing system 440 receives the data relating to the plane of focus and determines from the data the distance along the newly determined camera viewing vector for the camera 280 to be in optimum focus (step 7060). The processing system 440 then defines the new position of the subject matter 500 in the world coordinate system as the point along the new camera viewing vector that is equal to the predetermined distance from the camera 280 for the camera to be in optimum focus using camera support structure 20, camera head 270, and camera 280 configuration criteria (step 7070). The new subject matter 500 position is now defined within the processing system 440 and is used in step 1030 in calculating the desired camera viewing vector for the movements of the camera support structure 20 as previously described in relation to FIG. 6.

It is noted that each of the preferred automatic pan and tilt compensation control system architectures include overlapping architecture components. Consequently, it is contemplated that the preferred steps relating to the first preferred automatic pan and tilt compensation control system architecture may also be employed with respect to the second and third preferred automatic pan and tilt compensation control system architectures. For example, the preferred steps described in relation to FIG. 4 may be substituted for the corresponding preferred steps described in relation to FIGS. 13 and 16 of the second and third preferred control system architectures.

Furthermore, it is to be understood that the automatic pan and tilt compensation control system architectures disclosed herein are also capable of being implemented with a gyro stabilized camera head. In such an implementation the compensation of the gyro stabilized head is taken into account in determining the appropriate compensation of the camera head 270 for the movements of the support structure 20 and/or subject matter 500.

It is further noted that an additional advantage of the automatic pan and tilt compensation system disclosed herein is its ability to obtain as an end product meta-data relating to the orientation of the camera, camera head, and support structure during a given shot in preferably 3-dimensional space relative to a defined or fixed coordinate system. Such meta-data has particular utility in integrating the shot with computer graphics or other special effects as well as having considerable usefulness in other processing and editing tasks.

The descriptions provided above utilized a position-based system in which Cartesian coordinates were used to define a point in space. Alternatively, a cylindrical coordinate system may be used in which space is viewed as a general cylinder of interest around the post of the support shaft of the remote camera head crane, and an operator provides the radius of the cylinder (the distance from the support shaft to the general area of interest) via an input device such as a distance knob on a control module. The distance provided by the operator may be intentionally slightly greater than the distance to the general area of interest. By doing so, subjects that are off to one side of the composition can still be properly framed. As with the Cartesian coordinate system, all of the gains and vectors described above are calculated based on the operator-provided distance. In all mechanical aspects, a remote camera head crane that uses cylindrical coordinates to define space is identical to a remote camera head crane that uses Cartesian coordinates, as described above. Conversion between cylindrical and Cartesian coordinates is a straightforward process well-understood by those skilled in the art.

In an alternative embodiment of the present invention, a velocity-based system is employed instead of the above-described position-based system. To create a velocity-based system, tachometers can be mounted to the swing arm of the crane to generate a voltage that causes the head to rotate in a direction opposite to that of the arm.

The invention and development of remote camera heads enabled lighter and more portable cranes to be developed. With a remote camera head mounted to the end of a crane, the camera could be placed and pointed almost anywhere in space, and moved very rapidly through space, and more complex and sophisticated filming sequences became a reality.

"Steadycams" have also been developed to satisfy the demand for complex filming sequences. The steadycam is a body-mounted handheld camera that utilizes a vest and a mounting device to transfer the weight of the camera to the operator's body. A steadycam allows the operator virtually unlimited degrees of freedom to spin in space, run up stairs, and generally move to any location and orientation that a human can achieve, but it is limited by the human operator's strength, size and capabilities.

At one time, camera dollies had to be placed on tracks to limit vibrations, and thus were not a suitable substitute for steadycams, but with the development of steadycam technology, modern camera heads could absorb a certain amount of vibration from the floor, freeing dollies to perform "dance floor" moves, such as entering a doorway, moving completely around a table, etc. Dollies also provided crisper movement and a steadier feel over the steadycam with less reliance on the skill of the operator However, with a human-operated camera mounted on a dolly, movement of the camera itself was often limited. For example, to make a complex camera movement, the operator might have to hang off one side of the dolly at one point in time, then swing around to the other side to pan the camera while the dolly is moving, all the while turning a crank to raise the camera and going from squatting to tiptoes.

Thus, there is a need to place remote camera heads on dollies. However, as with remote camera heads on crane arms, when remote camera heads are placed on dollies the camera operator is once again separated from the camera and the feel of the inertial forces of the dolly. Without the automatic pan and tilt control described above, the operator would have to monitor the current filming sequence at all times and spend a lot of time rehearsing with the dolly grip to determine where the stops are, where the wheels change direction, etc. Thus, there is a further need for automatic pan and tilt compensation on remote camera head dollies. Automatic pan and tilt compensation helps the operator make corrections for the motions of the dolly and reduces or eliminates the need for rehearsing.

However, remote camera head dollies have unique characteristics not present in remote camera head cranes, and thus have a unique set of challenges that must be overcome. Unlike a crane, in which the central pivot point is typically (although not necessarily) fixed during the shot, the dolly can move the pivot point to virtually any location within the scene. Furthermore, movement of the dolly is achieved by steering the wheels in a number of potentially complex configurations, and thus a number of sensors must be employed on the wheels of the dolly to ascertain and track the position of the dolly as it is wheeled about the set.

Figure 18:
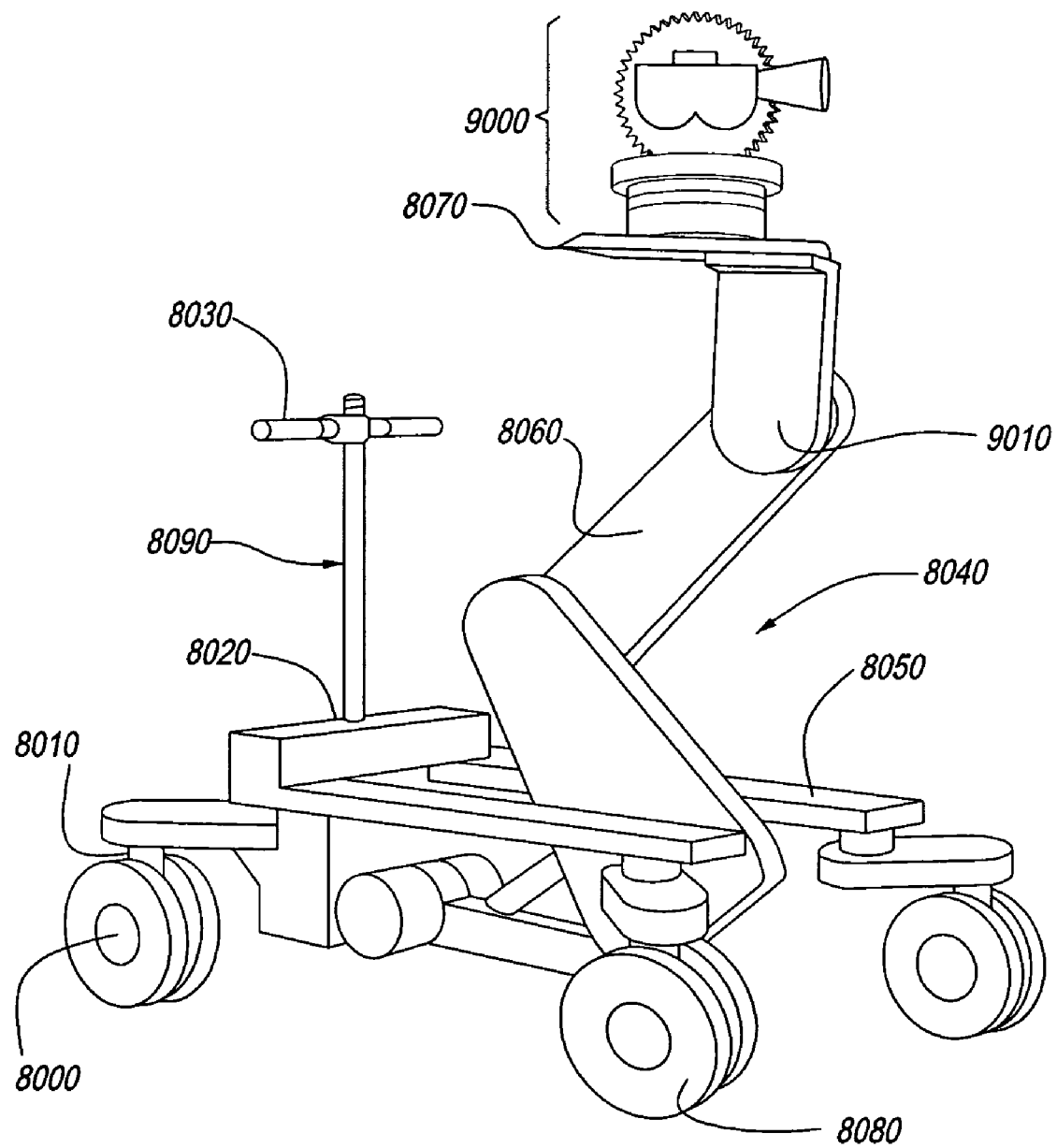
FIG. 18 is an perspective view of a remote camera head dolly according to embodiments of the present invention.

A remote camera dolly 8040 is illustrated in FIG. 18, with the axles and drive mechanism eliminated for clarity. The dolly 8040 may include a frame 8050, one or more hinged arms 8060, a camera platform 8070, wheels 8080, a steering wheel 8030, and a steering shaft 8090. Supported on the platform 8070 is a remote camera head illustrated symbolically at 9000. The remote camera head 9000 includes all the motors and sensors for pan and tilt previously described with respect to FIGS. 1 and 2. Encoders are added to the wheels 8080 so the motion of the dolly can be sensed and taken into account. Encoders generally located at 8000 sense the actual rotation or travel of the wheels as they roll. These encoders are equivalent to dolly sensing device 110 in FIG. 1. Depending on the configuration of the axles, encoders generally located at 8010 sense the orientation of the wheels (i.e. how much they are turned). Alternatively, a sensor generally located at 8020 may be placed near the steering lever or wheel of the dolly 8030 to sense the orientation of the wheels. Sensors on the hinged arms or hydraulic arm generally located at 9010 sense the change in height of the camera.

The wheels of the dolly may turn in a number of ways. The rear wheels may be connected by a common rear axle, and thus steer together. Alternatively, the rear wheels may be connected by a common rear axle and thus steer together, and the front wheels may be connected by a common front axle and thus steer together, and the front and rear axles may steer independently or dependently (the "crab mode"). In yet another alternative, all four wheels may have independent axles that steer independently (the "roundy" mode). In general, one axle sensor must be used on each axle capable of independent movement, and one rotation sensor must be used for each wheel connected to each axle capable of independent movement. As an alternative to axle sensors, a sensor may sense the steering arm of the dolly and a sensor may sense the position of the switch lever that determines the steering mode of the dolly.

In the roundy mode, an alternative to sensors on all four wheels is an angular sensing device such as a gyroscope. One gyroscope mounted near the camera would sense angular rotation (the instantaneous angle that the dolly is moving at), and accelerometers would sense the lateral translations (the velocity of the dolly), and between the two, the current orientation of the dolly with respect to an initial camera angle can be determined. The gyroscope and accelerometer may be provided in a commonly available package that can also sense how high the camera is by detecting how high the camera has moved up and down from its original position.

It should also be understood that instead of wheels, any other mechanism that produces movement of the dolly with respect to the set may be used. For example, the wheels may be replaced by tractor-like treads, robotic legs, and the like. In these alternative embodiments, sensors appropriate to detect the linear and/or rotational translations of the mechanisms would be employed.

Figure 19:
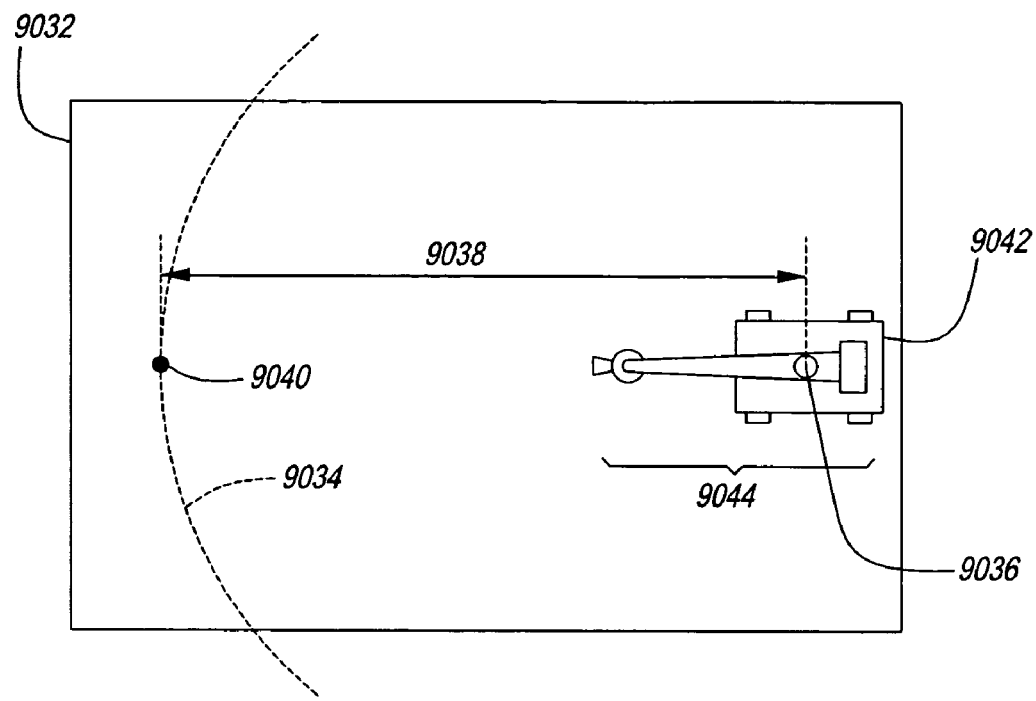
FIG. 19 is a top view of an example space (e.g. a movie set) within which a remote camera head crane may operate according to embodiments of the present invention.

FIG. 19 is a top view of an example space (e.g. a movie set) 9032 within which a remote camera head crane 9042 may operate. As noted above, in the remote camera crane system, the working space of the camera may viewed as a general cylinder of interest (shown only partially at 9034) around the post of the support shaft 9036. During initialization, the remote camera head crane is placed in an initial configuration 9044, and an operator provides the radius of the cylinder 9038 (the distance from the support shaft to the initial location of the general area of interest 9040) via an input device such as a distance knob on a control module. From the initial position of the crane 9044 and the initial distance to the area of interest 9038, the boom, swing, telescope, pan and tilt of the crane can thereafter be adjusted to position the remote camera head in just about any point in space and point the remote camera head in just about any direction in space to track the general area of interest, even if that area of interest should move.

Figure 20:
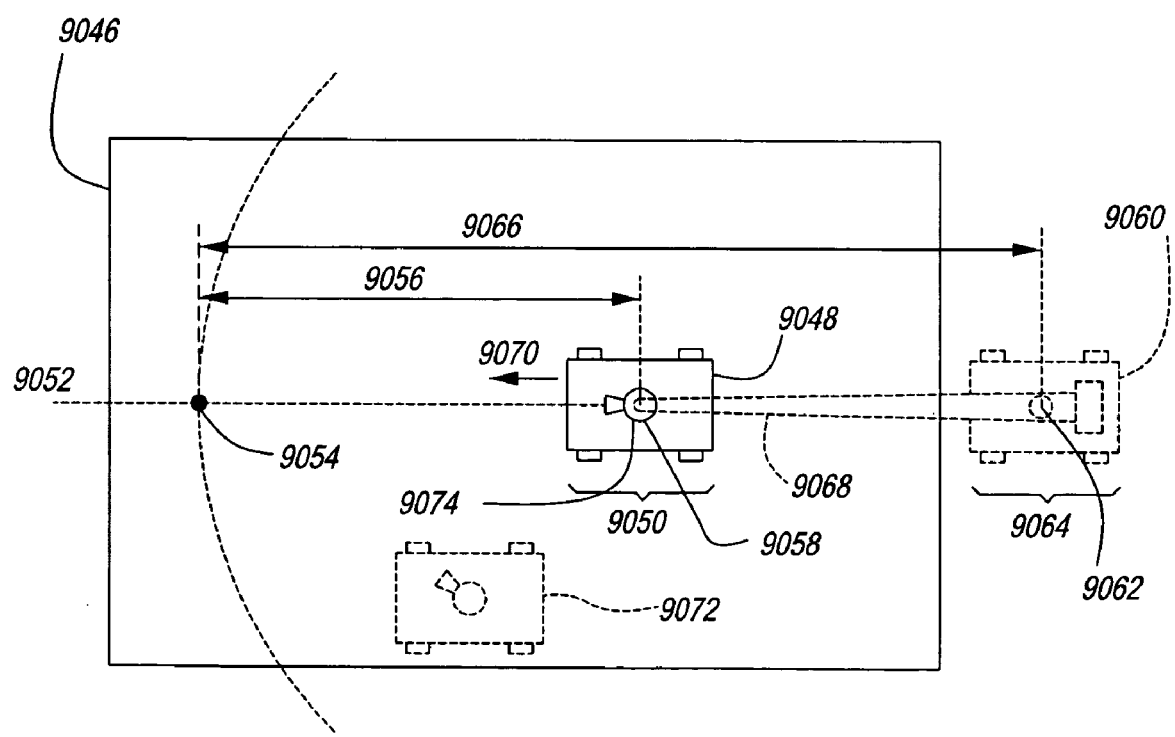
FIG. 20 is a top view of an example space (e.g. a movie set) within which a remote camera head dolly may operate, illustrating the imaginary remote camera head crane used for simplifying processing according to embodiments of the present invention.

FIG. 20 is a top view of an example space (e.g. a movie set) 9046 within which a remote camera head dolly 9048 may operate. The same cylindrical coordinate system may be employed in the remote camera dolly system. As with the remote camera head crane system, the remote camera head dolly system must be initially calibrated at an initial position 9050. The wheels of the dolly may be initially pointed parallel to the longitudinal axis 9052 of the dolly, which may be aligned with and pointed directly at the general area of interest 9054. The pan of the remote camera head is also adjusted to be parallel to the longitudinal axis of the dolly. The height of the platform on the dolly is set to a nominal height, and the tilt of the remote camera head is adjusted so that the camera points in a direction parallel to the ground.

Once the dolly and remote camera head are set to this initial configuration, the processing system takes sensor readings, and an operator provides the distance 9056 from the center post of the dolly 9058 to the general area of interest 9054. These readings establish the initial position of the dolly. Thereafter, the dolly 9048 can be moved to just about any point in space (but with more height restrictions), and the processing system uses the sensor data to determine the current location of the dolly as a delta from the last known position. The pan and tilt of the remote camera head can also be adjusted based on the position data to point the remote camera head in just about any direction in space to track the general area of interest, even if that area of interest should move. Note that it is not necessary to initialize the dolly before each shot as long as power is maintained to the dolly and the system and the current position calculations are not reset between shots.

One of the major differences between the two systems is that the remote camera crane system typically works in a cylinder of space with a fixed center (the support shaft 9036 of the crane in FIG. 19), but in a remote camera dolly system, the center of the dolly 9058 is likely to move to a number of different locations in space. If this difference is not taken into account, the processing algorithms needed to track the position of the camera head and make adjustments to the pan and tilt would need to be different for each of the two systems.

The remote camera head dolly system essentially eliminates this difference by conceptually creating an imaginary remote camera head crane and an imaginary fixed support shaft outside the space of interest. This imaginary remote camera head crane is used to simplify processing. As illustrated in FIG. 20, although the remote camera head 9064 of the remote camera head dolly 9048 is actually positioned at 9058, an imaginary remote camera head crane 9060 with an imaginary fixed support shaft 9062 is positioned at 9064, outside the space of interest 9046. An operator provides the radius of the cylinder 9066 (the distance from the imaginary fixed support shaft 9062 to the initial location of the general area of interest 9054) via an input device such as a distance knob on a control module. Thereafter, the remote camera head dolly 9048 of FIG. 20 can be computationally replaced by the imaginary remote camera head crane 9060 at a fixed location 9064. The remote camera head 9074 of the dolly 9048 can be viewed as being the remote camera head of the imaginary crane 9060, connected together by imaginary crane arm 9068.

If, for example, the dolly 9048 moves in the direction of the general area of interest indicated by arrow 9070, it is as though the imaginary crane arm 9068 is telescoping. If the dolly moves to location 9072 while panning to maintain a field of view on the general area of interest 9054, it is as though the imaginary crane arm 9068 has telescoped, swung to the left, and panned to the right (viewed looking toward the general area of interest). From these two examples, it is clear that as the dolly 9048 moves to any location within the set 9046 and adjusts its height, these movements can be equated to adjustments in the swing, telescope, boom, pan and tilt of the imaginary remote camera head crane 9060.

The position of the remote camera head dolly 9048 is tracked using different sensors than the remote camera head crane. For example, if the remote camera head dolly 9048 moves from location 9050 to location 9072 as shown in FIG. 20, instead of utilizing data from crane arm swing sensing device 150, crane arm telescope sensing device 200 and crane arm boom sensing device 160 (see FIG. 1), data from the sensors on the wheels and the platform of the remote camera head dolly 9048 are used to determine a change in position in the camera. The change in position can then converted to an amount of swing, telescope and boom (as though the remote camera head dolly 9048 was instead the imaginary remote camera head crane 9060). The swing, telescope and boom may then be input to a processor to determine how the pan and tilt of the remote camera must be adjusted to keep it pointing at the general area of interest 9054.

Figure 21:
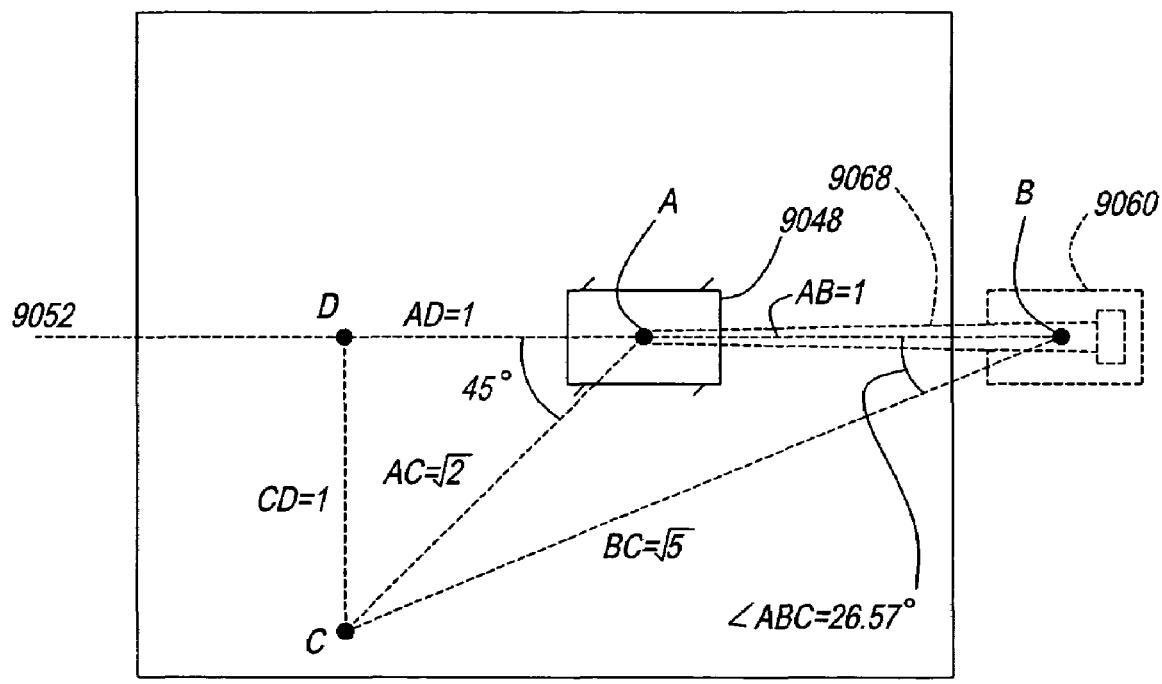
FIG. 21 illustrates an example of the use of the sensors on the remote camera head dolly to determine the position of the dolly and provide a swing and boom adjustment that may be input to a processor to determine how the pan and tilt of the remote camera must be adjusted to keep it pointing at the general area of interest, according to embodiments of the present invention.

FIG. 21 illustrates an example of the use of the sensors on the remote camera head dolly to determine the position of the dolly and provide a swing and boom adjustment that may be input to a processor to determine how the pan and tilt of the remote camera must be adjusted to keep it pointing at the general area of interest. In the example of FIG. 21, the remote camera head dolly 9048 is located at position A, which is 1 unit away from imaginary remote camera head crane 9060 located at position B (i.e. distance AB=1). Assume for this example that the imaginary crane arm 9068 and camera of the imaginary remote camera head crane 9060 extending from B to A is perfectly level. If the wheels are all aligned (the "crab mode") such that the sensors on the wheels determine that the wheels are angled at 45 degrees with respect to the longitudinal axis 9052 of the remote camera head dolly 9048, and the sensors further determine that the wheels have rolled for a distance of $\sqrt{2}$ units, then the remote camera head dolly 9048 will have moved from position A to position C. Based on this simple geometry, it is evident that distances AD and CD are also 1 unit long, and that distance BC is 2.236 units long ($\sqrt{5}$ units). It is also evident using simple trigonometry that the angle ABC is 26.57 degrees. This implies that the imaginary crane arm 9068 would have to telescope 1.236 units and swing to the left by 26.57 degrees to reach position C.

From this preceding example, it should be clear that data from the sensors on the remote camera head dolly 9048 can be converted to the equivalent data from the swing, boom and telescope sensors on the imaginary remote camera head crane 9060, which allows the same processing algorithms utilized for a remote camera head crane to compute the necessary pan and tilt of the remote camera head to keep it pointed at the general area of interest.

It should be understood that the features and aspects of the remote camera head dolly described above are not limited to dollies, but are also applicable to vehicles, camera cars, offroad vehicles, surfboards, robotic devices, steadycams with remote camera heads, and the like. In general, embodiments of the invention described above with respect to dollies encompass a remote camera head having any type of support system, because sensors such as inertial sensors may be applied to the support system to provide the required position information.

While there has been illustrated and described what are at present considered to be preferred embodiments, features and methods of the present invention, it will be understood by those skilled in the art that various changes and modifications may be made, and equivalents may be substituted for elements thereof without departing from the scope of the invention.

In addition, many modifications may be made to adapt a particular, element, feature or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. An automated remote camera head pan and tilt compensation system comprising:
   a dolly configured to be capable of movement with multiple degrees of freedom;
   a remote camera head coupled to the dolly and adapted to pan and tilt;
   one or more sensors coupled to the dolly for generating data related to a direction and travel of the dolly; and
   a processing system coupled to the dolly and configured for receiving the data from the sensors, continuously updating a position of the dolly, and transmitting signals to the remote camera head to pan and tilt the remote camera head to compensate for movements of the dolly so that regardless of the movement of the dolly, the remote camera head maintains its field of view generally centered on a position of a subject matter;
   wherein the processing system is further configured for treating the dolly as an imaginary remote camera head crane with a remote camera head of the imaginary remote camera head crane located at an actual position of the remote camera head on the dolly.

2. The automated camera head pan and tilt compensation system according to claim 1, wherein the processing system is further configured for converting the sensor data to swing, boom and telescope movements of the imaginary remote camera head crane to assist in determining the automatic pan and tilt compensation for the remote camera head on the dolly.

3. The automated camera head pan and tilt compensation system according to claim 1, further comprising a subject matter position sensing means configured for monitoring and transmitting data to the processing system relating to movement of the subject matter;
   wherein the processing system is communicatively coupled to the subject matter position sensing means for receiving and processing the data from the subject matter position sensing means and transmitting signals to the remote camera head to pan and tilt the camera head to compensate for changes in the position of the subject matter.

4. The automated camera head pan and tilt compensation system according to claim 1, further comprising steerable wheels coupled to the dolly and configurable in one or more modes for facilitating movement of the dolly.

5. The automated camera head pan and tilt compensation system according to claim 1, further comprising a leveling mechanism supported on the dolly and configured to maintain the remote camera head parallel to a frame of the dolly as a height of the remote camera head is varied with respect to the frame of the dolly.

6. The automated camera head pan and tilt compensation system according to claim 1, the sensors comprising an angular sensing device for sensing angular rotation of the dolly and an accelerometer for sensing lateral translations of the dolly.

7. The automated camera head pan and tilt compensation system according to claim 1, the processing system further configured for establishing an initial position of the dolly by taking sensor readings when the dolly has been placed in a known configuration in front of the subject matter and receiving a distance input from an operator.

8. The automated camera head pan and tilt compensation system according to claim 1, wherein the movement of the dolly includes dance floor moves.

9. The automated camera head pan and tilt compensation system according to claim 1, further comprising means by which the compensation of tilt and pan of the camera head may be adjusted by a user.

10. A method for automatically compensating the pan and tilt of a remote camera head coupled to a dolly, comprising:
    defining a position of the remote camera head coupled to the dolly and a position of a subject matter relative to the dolly;
    generating sensor data related to a direction and travel of the dolly;
    continuously updating a position of the dolly;
    transmitting signals to the remote camera head to pan and tilt the remote camera head to compensate for movements of the dolly so that regardless of a movement of the dolly, the remote camera head maintains its field of view generally centered on the position of the subject matter; and
    treating the dolly as an imaginary remote camera head crane with the remote camera head of the imaginary remote camera head crane located at the actual position of the remote camera head on the dolly.

11. The method for automatically compensating the pan and tilt of a remote camera head coupled to a dolly according to claim 10, further comprising converting the sensor data to swing, boom and telescope movements of the imaginary remote camera head crane to assist in determining the automatic pan and tilt compensation for the remote camera head on the dolly.

12. The method for automatically compensating the pan and tilt of a remote camera head coupled to a dolly according to claim 10, further comprising:
   generating data related to movement of the subject matter;
   continuously updating a position of the subject matter; and
   transmitting signals to the remote camera head to pan and tilt the remote camera head to compensate for changes in the position of the subject matter so that regardless of the movement of the subject matter, the remote camera head maintains its field of view generally centered on the position of the subject matter.

13. The method for automatically compensating the pan and tilt of a remote camera head coupled to a dolly according to claim 10, further comprising configuring steerable wheels coupled to the dolly into one or more modes for facilitating movement of the dolly.

14. The method for automatically compensating the pan and tilt of a remote camera head coupled to a dolly according to claim 10, further comprising maintaining the remote camera head level with respect to a frame of the dolly in response to changes in a height of the remote camera head with respect to the frame of the dolly.

15. The method for automatically compensating the pan and tilt of a remote camera head coupled to a dolly according to claim 10, the step of generating sensor data related to a direction and travel of the dolly further comprising sensing an angular rotation of the dolly and sensing lateral translations of the dolly.

16. The method for automatically compensating the pan and tilt of a remote camera head coupled to a dolly according to claim 10, further comprising establishing an initial position of the dolly by taking sensor readings when the dolly has been placed in a known configuration in front of the subject matter, and receiving a distance input from an operator.

17. The method for automatically compensating the pan and tilt of a remote camera head coupled to a dolly according to claim 10, wherein the movement of the dolly includes dance floor moves.

18. The method for automatically compensating the pan and tilt of a remote camera head coupled to a dolly according to claim 10, further comprising providing user-adjustable means by which the compensation of tilt and pan of the remote camera head may be adjusted.

* * * * *